US012676168B2

(12) United States Patent (10) Patent No.: US 12,676,168 B2
Yamaga et al. (45) Date of Patent: Jul. 7, 2026

(54) MAGNETIC RECORDING MEDIUM AND CARTRIDGE

(71) Applicant: Sony Group Corporation, Tokyo (JP)

(72) Inventors: Minoru Yamaga, Tokyo (JP); Yuuko Kamoshita, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 19/113,131

(22) PCT Filed: Oct. 20, 2023

(86) PCT No.: PCT/JP2023/037983
§ 371 (c)(1),
(2) Date: Mar. 19, 2025

(87) PCT Pub. No.: WO2024/090340
PCT Pub. Date: May 2, 2024

(65) Prior Publication Data
US 2026/0100199 A1 Apr. 9, 2026

(30) Foreign Application Priority Data
Oct. 26, 2022 (JP) ................................ 2022-171754

(51) Int. Cl.
*G11B 5/78* (2006.01)
*G11B 5/706* (2006.01)
(Continued)

(52) U.S. Cl.
CPC ............ *G11B 5/78* (2013.01); *G11B 5/70678* (2013.01); *G11B 5/714* (2013.01); *G11B 5/7367* (2019.05)

(58) Field of Classification Search
None
See application file for complete search history.

(56) References Cited

U.S. PATENT DOCUMENTS

| | | | | |
|---|---|---|---|---|
| 6,475,598 B1 * | 11/2002 | Naoe | ................... | G11B 5/7085 |
| | | | | 428/323 |
| 8,611,047 B2 * | 12/2013 | Ohtsu | ................... | G11B 5/584 |
| | | | | 360/96.1 |

(Continued)

FOREIGN PATENT DOCUMENTS

| | | |
|---|---|---|
| JP | 2021034068 A | 3/2021 |
| JP | 2021034108 A | 3/2021 |
| WO | 2022/209935 A1 | 10/2022 |

OTHER PUBLICATIONS

International Search Report of PCT Application No. PCT/JP2023/037983, dated Dec. 5, 2023.

*Primary Examiner* — Peter Vincent Agustin
(74) *Attorney, Agent, or Firm* — K&L Gates LLP

(57) ABSTRACT

To provide a magnetic recording medium with which excellent electromagnetic conversion characteristics can be obtained.

A magnetic recording medium is a tape-type magnetic recording medium and includes a base body and a magnetic layer. An average thickness of the magnetic recording medium is 5.30 µm or less. When a power spectral density at each position of spatial wavelength $\lambda_n = 100/n$ [µm] (provided that n is an integer of 1 or more and 255 or less) is obtained using a 2D surface profile image of a measurement range of 100 [µm]×100 [µm], that has been acquired by measuring a surface on a side of the magnetic layer by an atomic force microscope, a ratio $I_{\lambda_n \leq 5}/I_{10 \leq \lambda_n \leq 20}$ between an average value $I_{\lambda_n \leq 5}$ of integrated values of the power spectral density within a range of spatial wavelength $\lambda_n \leq 5$ µm and an average value $I_{10 \leq \lambda_n \leq 20}$ of integrated values of the power spectral density within a range of 10 µm≤spatial wavelength $\lambda_n \leq 20$ µm is 3.00 or less. An average value of a kurtosis on the surface on the side of the magnetic layer is 5.50 or less.

20 Claims, 12 Drawing Sheets

(51) Int. Cl.
  G11B 5/714 (2006.01)
  G11B 5/73 (2006.01)

(56) References Cited

U.S. PATENT DOCUMENTS

|  |  |  |  |  |
|---|---|---|---|---|
| 9,564,161 | B1 * | 2/2017 | Cherubini | G11B 5/588 |
| 2003/0082409 | A1 * | 5/2003 | Yamazaki | G11B 5/70678 |
|  |  |  |  | 428/836 |
| 2003/0113586 | A1 * | 6/2003 | Mori | G11B 5/70678 |
| 2006/0263644 | A1 * | 11/2006 | Greczyna | G11B 5/7358 |
| 2007/0054039 | A1 * | 3/2007 | Tanaka | G11B 5/7334 |
|  |  |  |  | 427/127 |
| 2013/0286497 | A1 * | 10/2013 | Morling | G11B 20/10037 |
|  |  |  |  | 360/39 |
| 2015/0194174 | A1 * | 7/2015 | Sekiguchi | G11B 5/7369 |
|  |  |  |  | 428/831 |
| 2020/0279679 | A1 * | 9/2020 | Tsujimoto | H01F 1/344 |
| 2020/0312364 | A1 * | 10/2020 | Terakawa | G11B 5/733 |
| 2021/0043224 | A1 * | 2/2021 | Endo | B24B 41/06 |
| 2022/0165302 | A1 * | 5/2022 | Yamaga | G11B 5/73927 |
| 2022/0284924 | A1 * | 9/2022 | Terakawa | G11B 5/78 |
| 2024/0371405 | A1 * | 11/2024 | Oikawa | G11B 5/78 |

* cited by examiner

MAGNETIC RECORDING MEDIUM AND CARTRIDGE

TECHNICAL FIELD

The present disclosure relates to a magnetic recording medium and a cartridge including the same.

BACKGROUND ART

In recent years, tape-type magnetic recording media have been widely used to store electronic data. In the tape-type magnetic recording media, for obtaining favorable electromagnetic conversion characteristics, it is desired to reduce a height of concavities and convexities on a surface on a magnetic layer side and smoothen the surface on the magnetic layer side. Patent Literature 1 describes that when an arithmetic average roughness Ra of the surface on the magnetic layer side is 2.5 nm or less, excellent SNR (electromagnetic conversion characteristics) can be obtained.

CITATION LIST

Patent Literature

Patent Literature 1: Japanese Patent Application Laid-open No. 2021-34108

DISCLOSURE OF INVENTION

Technical Problem

However, even when the arithmetic average roughness Ra of the surface on the magnetic layer side is 2.5 nm or less, excellent electromagnetic conversion characteristics may not be obtained in some cases.

An object of the present disclosure is to provide a magnetic recording medium with which excellent electromagnetic conversion characteristics can be obtained, and a cartridge including the same.

Solution to Problem

To solve the problems described above, a magnetic recording medium according to the present disclosure is a tape-type magnetic recording medium, including:

a base body; and a magnetic layer, in which an average thickness of the magnetic recording medium is 5.30 μm or less, when a power spectral density at each position of spatial wavelength $\lambda_n=100/n$ [μm] (provided that n is an integer of 1 or more and 255 or less) is obtained using a 2D surface profile image of a measurement range of 100 [μm]×100 [μm], that has been acquired by measuring a surface on a side of the magnetic layer by an atomic force microscope, a ratio $I_{\lambda_n \leq 5}/I_{10 \leq \lambda_n \leq 20}$ between an average value $I_{\lambda_n \leq 5}$ of integrated values of the power spectral density within a range of spatial wavelength $\lambda_n \leq 5$ μm and an average value $I_{10 \leq \lambda_n \leq 20}$ of integrated values of the power spectral density within a range of 10 μm≤spatial wavelength $\lambda_n \leq 20$ μm is 3.00 or less, and an average value of a kurtosis on the surface on the side of the magnetic layer is 5.50 or less.

A magnetic recording medium according to the present disclosure is a tape-type magnetic recording medium, including:

a base body; and a magnetic layer, in which an average thickness of the magnetic recording medium is 5.30 μm or less, and when a power spectral density at each position of spatial wavelength $\lambda_n=100/n$ [μm] (provided that n is an integer of 1 or more and 255 or less) is obtained using a 2D surface profile image of a measurement range of 100 [μm]×100 [μm], that has been acquired by measuring a surface on a side of the magnetic layer by an atomic force microscope, a ratio $I_{\lambda_n \leq 5}/I_{10 \leq \lambda_n \leq 20}$ between an average value $I_{\lambda_n \leq 5}$ of integrated values of the power spectral density within a range of spatial wavelength $\lambda_n \leq 5$ μm and an average value $I_{10 \leq \lambda_n \leq 20}$ of integrated values of the power spectral density within a range of 10 μm≤spatial wavelength $\lambda_n \leq 20$ μm is 3.00 or less.

A cartridge according to the present disclosure includes any of the magnetic recording media according to the present disclosure.

MODES FOR CARRYING OUT THE INVENTION

Figure 1:
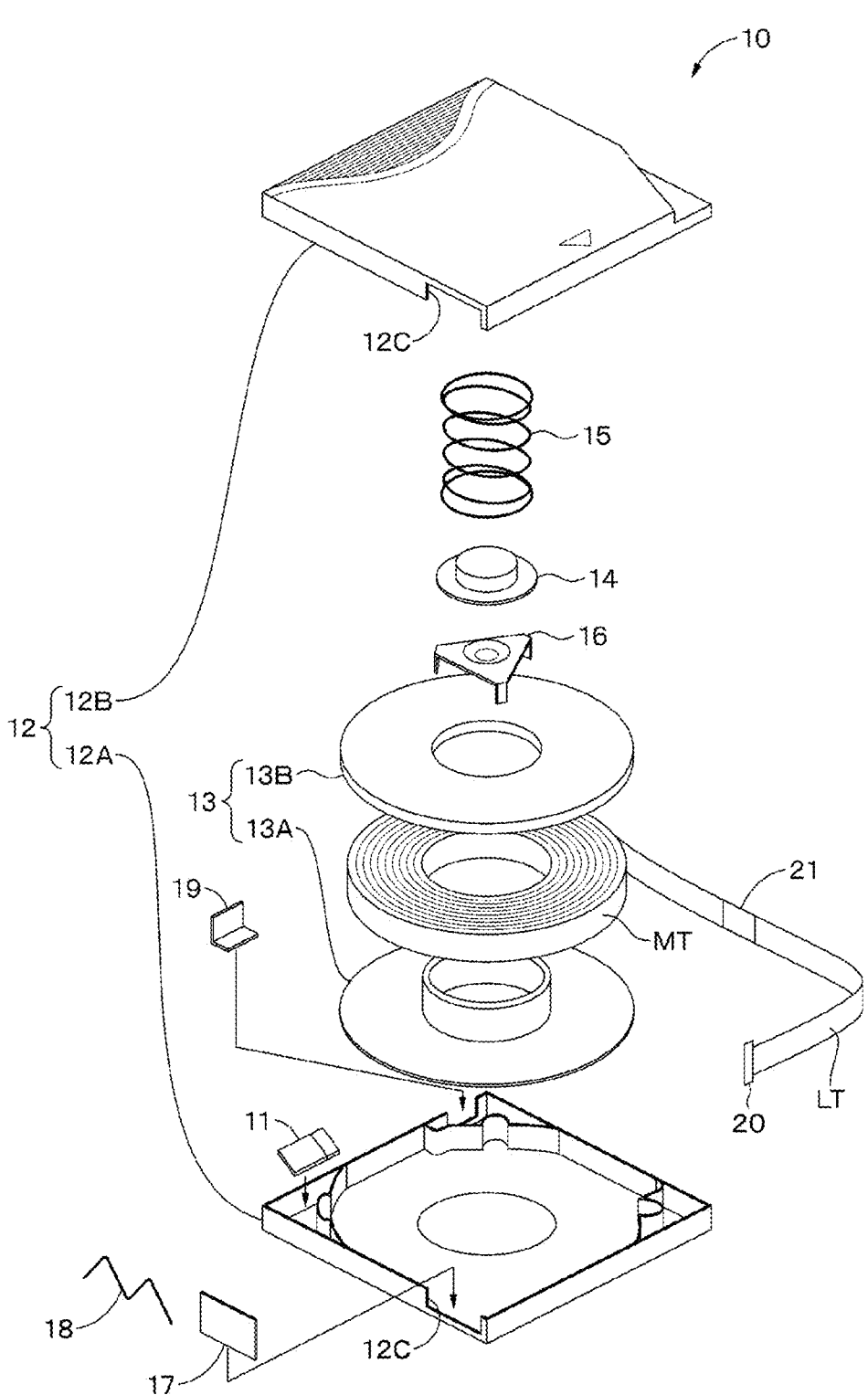
FIG. 1 is an exploded perspective view showing an exemplary configuration of a cartridge according to an embodiment of the present disclosure.

Hereinafter, an embodiment of the present disclosure will be described in the following order.

1 Configuration of cartridge
2 Configuration of cartridge memory
3 Configuration of magnetic tape
4 Manufacturing method of magnetic tape
5 Operation and effect
6 Modified example In the present specification, when a measurement environment is not stated in particular regarding descriptions on measurement methods and evaluation methods, it is assumed that the measurements are performed under an environment of 25° C.±2° C. and 50% RH±5% RH.

1 Configuration of Cartridge

FIG. 1 is an exploded perspective view showing an exemplary configuration of a cartridge 10. The cartridge 10 is a single-reel-type cartridge and includes, inside a cartridge case 12 constituted of a lower shell 12A and an upper shell 12B: one reel 13 around which a tape-type magnetic recording medium (hereinafter, will be referred to as "magnetic tape") MT is wound; a reel lock 14 and a reel spring 15 used for locking a rotation of the reel 13; a spider 16 for releasing a locked state of the reel 13; a slide door 17 which opens and closes a tape drawing outlet 12C provided in the cartridge case 12 across the lower shell 12A and the upper shell 12B; a door spring 18 which biases the slide door 17 to a closing position of the tape drawing outlet 12C; a write protect 19 for preventing an accidental deletion from occurring; and a cartridge memory 11. The reel 13 for winding the magnetic tape MT has substantially a disk shape including an opening at a center portion thereof, and is constituted of a reel hub 13A and a flange 13B that are formed of a hard material such as plastic. A leader tape LT is connected at an end portion of the magnetic tape MT on an outer circumferential side. A leader pin 20 is provided at a tip end of the leader tape LT.

The cartridge 10 may be a magnetic tape cartridge conforming to an LTO (Linear Tape-Open) standard, or may be a magnetic tape cartridge conforming to a standard different from the LTO standard.

The cartridge memory 11 is provided in the vicinity of one corner portion of the cartridge 10. In a state where the cartridge 10 is loaded in a recording/reproducing device, the cartridge memory 11 is provided to oppose a reader/writer of the recording/reproducing device. The cartridge memory 11 communicates with the recording/reproducing device, specifically the reader/writer, under a wireless communication standard conforming to the LTO standard.

2 Configuration of Cartridge Memory

Figure 2:
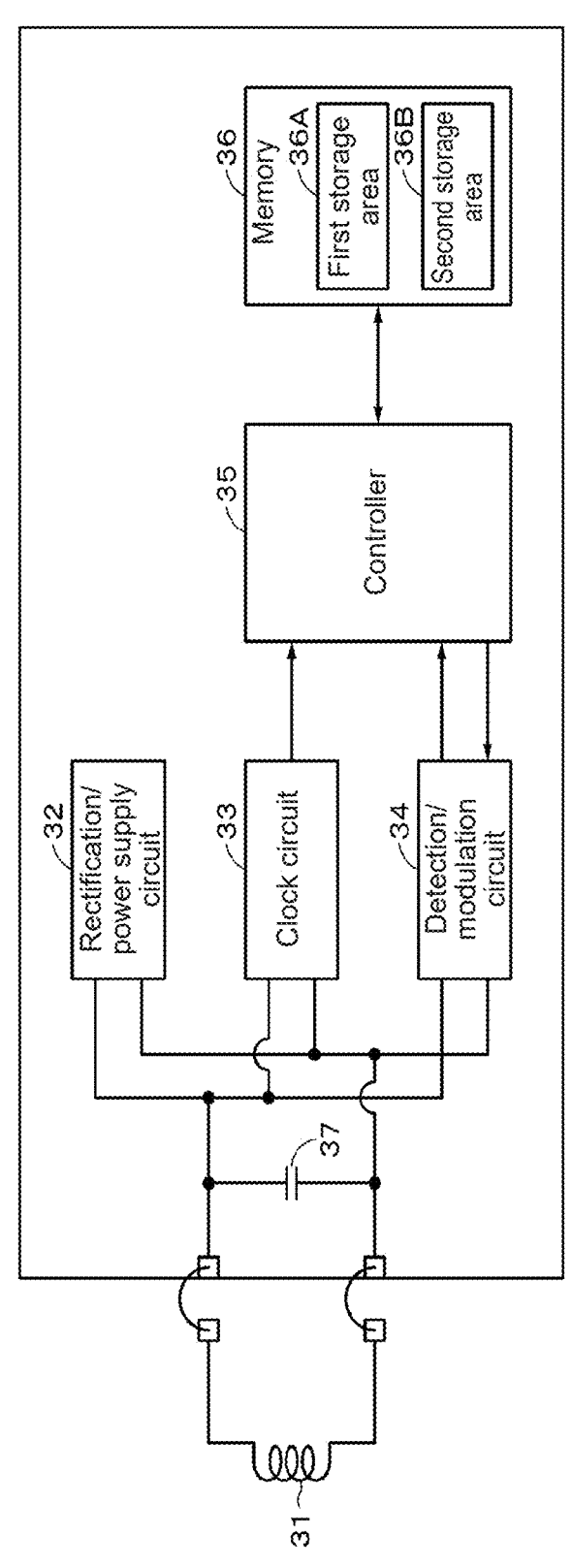
FIG. 2 is a block diagram showing an exemplary configuration of a cartridge memory.

FIG. 2 is a block diagram showing an exemplary configuration of the cartridge memory 11. The cartridge memory 11 includes: an antenna coil (communication unit) 31 which communicates with the reader/writer under a specified communication standard; a rectification/power supply circuit 32 which generates power using an induced electromotive force from radio waves received by the antenna coil 31, and rectifies it to generate a power supply; a clock circuit 33 which generates clocks also using the induced electromotive force from the radio waves received by the antenna coil 31; a detection/modulation circuit 34 which performs detection of the radio waves received by the antenna coil 31 and modulation of signals to be transmitted by the antenna coil 31; a controller (control unit) 35 constituted of a logic circuit or the like for discriminating commands and data from digital signals extracted from the detection/modulation circuit 34, and processing the commands and data; and a memory (storage unit) 36 which stores information. Further, the cartridge memory 11 includes a capacitor 37 connected in parallel with the antenna coil 31, and the antenna coil 31 and the capacitor 37 form a resonance circuit.

The memory 36 stores information related to the cartridge 10, and the like. The memory 36 is a nonvolatile memory (Non Volatile Memory: NVM). A storage capacity of the memory 36 is favorably about 32 KB or more.

The memory 36 may include a first storage area 36A and a second storage area 36B. The first storage area 36A is, for example, an area that corresponds to a storage area of a cartridge memory conforming to a magnetic tape standard before a specified generation (for example, the LTO standard before LTO8) and is used for storing information conforming to the magnetic tape standard before a specified generation. The information conforming to the magnetic tape standard before a specified generation is, for example, manufacturing information (for example, a unique number of the cartridge 10, or the like), a usage history (for example, the number of times of tape draw-out (Thread Count)), and the like.

The second storage area 36B corresponds to an extended storage area with respect to the storage area of the cartridge memory conforming to the magnetic tape standard before a specified generation (for example, the LTO standard before LTO8). The second storage area 36B is an area for storing additional information. Herein, the additional information refers to, for example, information related to the cartridge 10, that is not defined by the magnetic tape standard before a specified generation (for example, the LTO standard before LTO8). The additional information includes, for example, at least one type of information selected from the group consisting of tension adjustment information, management ledger data, Index information, thumbnail information, and the like, but is not limited to these pieces of data. The tension adjustment information is information for adjusting a tension applied in a longitudinal direction of the magnetic tape MT. The tension adjustment information includes, for example, at least one type of information selected from the group consisting of information obtained by intermittently measuring a width between servo bands in the longitudinal direction of the magnetic tape MT, tension information of a drive, information on a temperature and humidity of the drive, and the like. These pieces of information are sometimes managed in link with information related to a usage condition of the cartridge 10, and/or the like. It is favorable for the tension adjustment information to be acquired when recording data or before recording data onto the magnetic tape MT. The tension information of a drive refers to information on a tension applied in the longitudinal direction of the magnetic tape MT.

The management ledger data is data including at least one type of information selected from the group consisting of a capacity, created date, edited date, storage location, and the like of a data file recorded on the magnetic tape MT. The Index information is metadata for searching a content of a data file. The thumbnail information is a thumbnail of a moving image or a still image stored in the magnetic tape MT.

The memory 36 may include a plurality of banks. In this case, the first storage area 36A may be constituted of some of the plurality of banks, and the second storage area 36B may be constituted of the rest of the banks.

The antenna coil 31 induces an induced voltage by electromagnetic induction. The controller 35 communicates with the recording/reproducing device under the specified communication standard via the antenna coil 31. Specifically, for example, mutual authentications, transmissions and receptions of commands, exchanges of data, and the like are performed.

The controller 35 stores information received from the recording/reproducing device via the antenna coil 31 in the memory 36. For example, the tension adjustment information received from the recording/reproducing device via the antenna coil 31 is stored in the second storage area 36B of the memory 36. The controller 35 reads out information from the memory 36 in response to a request from the recording/reproducing device, and transmits the information to the recording/reproducing device via the antenna coil 31. For example, the tension adjustment information is read out from the second storage area 36B of the memory 36 in response to a request from the recording/reproducing device, and the tension adjustment information is transmitted to the recording/reproducing device via the antenna coil 31.

3 Configuration of Magnetic Tape

Figure 3:
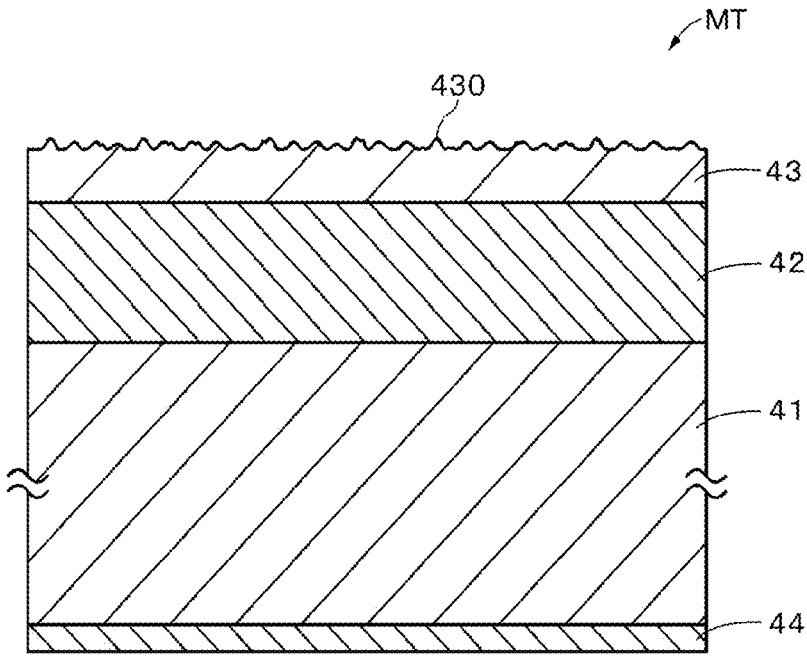
FIG. 3 is a cross-sectional view showing an exemplary configuration of a magnetic tape.

FIG. 3 is a cross-sectional view showing an exemplary configuration of the magnetic tape MT. The magnetic tape MT includes an elongated base body 41, an underlayer 42 provided above one of main surfaces (first main surface) of the base body 41, a magnetic layer 43 provided above the underlayer 42, and a back layer 44 provided on the other one of the main surfaces (second main surface) of the base body 41. It is noted that the underlayer 42 and the back layer 44 are provided as necessary and do not need to be provided. The magnetic tape MT may be a vertical-recording-type magnetic recording medium, or may be a longitudinal-recording-type magnetic recording medium. It is favorable for the magnetic tape MT to contain a lubricant from a viewpoint of improving running performance. The lubricant may be contained in at least one of the underlayer 42 or the magnetic layer 43.

The magnetic tape MT may be a magnetic tape conforming to the LTO standard, or may be a magnetic tape conforming to a standard different from the LTO standard. A width of the magnetic tape MT may be ½ inch, or may be larger than ½ inch. When the magnetic tape MT conforms to the LTO standard, the width of the magnetic tape MT is ½ inch. The magnetic tape MT may have a configuration with which the width of the magnetic tape MT can be maintained constant or almost constant by adjusting a tension applied in the longitudinal direction of the magnetic tape MT during running by the recording/reproducing device (drive).

The magnetic tape MT has an elongated shape and runs in the longitudinal direction during recording/reproduction. It is favorable for the magnetic tape MT to be used in a recording/reproducing device that includes a ring-type head as a recording head. It is favorable for the magnetic tape MT to be used in a recording/reproducing device configured to be capable of recording data at a data track width of 1200 nm or less or 1000 nm or less.

It is favorable for the magnetic tape MT to be reproduced by a reproducing head that uses a TMR device. Signals reproduced by the reproducing head that uses TMR may be data recorded in a data band DB (see FIG. 4), or may be a servo pattern (servo signals) recorded in a servo band SB (see FIG. 4).

(Base Body)

The base body 41 is a non-magnetic supporting body that supports the underlayer 42 and the magnetic layer 43. The base body 41 has an elongated film shape. An upper limit value of an average thickness of the base body 41 is favorably 4.40 µm or less, more favorably 4.20 µm or less, further more favorably 4.00 µm or less, particularly favorably 3.80 µm or less, most favorably 3.40 µm or less. When the upper limit value of the average thickness of the base body 41 is 4.40 µm or less, a recording capacity that can be recorded in a single data cartridge can be made higher than that of a general magnetic tape. A lower limit value of the average thickness of the base body 41 is favorably 3.00 µm or more, more favorably 3.20 µm or more. When the lower limit value of the average thickness of the base body 41 is 3.00 µm or more, lowering of an intensity of the base body 41 can be suppressed.

The average thickness of the base body 41 is obtained as follows. First, the magnetic tape MT accommodated in the cartridge 10 is unwound, and the magnetic tape MT is cut out at a length of 250 mm at a position that is 30 m to 40 m in the longitudinal direction from one end of the magnetic tape MT on the outer circumferential side, to thus produce a sample. In the present specification, the "longitudinal direction" used in "in the longitudinal direction from one end of the magnetic tape MT on the outer circumferential side" refers to a direction that is directed from the one end of the magnetic tape MT on the outer circumferential side toward the other end on an inner circumferential side.

Subsequently, layers of the sample other than the base body 41 (that is, the underlayer 42, the magnetic layer 43, and the back layer 44) are removed by using a solvent such as MEK (methyl ethyl ketone) or dilute hydrochloric acid. Next, using a laser hologauge (LGH-110C) manufactured by Mitutoyo Corporation as a measurement device, a thickness of the sample (base body 41) is measured at five positions, and those measurement values are simply averaged (arithmetic average), to thus calculate the average thickness of the base body 41. It is noted that the five measurement positions are randomly selected from the sample such that the five measurement positions become different positions in the longitudinal direction of the magnetic tape MT.

For example, the base body 41 contains a polyester-based resin as a main component. The polyester-based resin includes, for example, at least one type selected from the group consisting of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p(oxybenzoate)), and polyethylene bisphenoxy carboxylate. When the base body 41 contains two or more types of polyester-based resins, those two or more types of polyester-based resins may be mixed, copolymerized, or laminated. At least one of a terminal or side chain of the polyester-based resin may be denaturalized. The base body 41 may contain resin other than the polyester-based resin, that is to be described later, in addition to the polyester-based resin.

In the present specification, the "main component" refers to a component having a highest content percentage out of the components forming the base body 41. For example, when the main component of the base body 41 is the polyester-based resin, a content percentage of the polyester-based resin in the base body 41 may be, for example, 50 mass % or more, 60 mass % or more, 70 mass % or more, 80 mass % or more, 90 mass % or more, 95 mass % or more, or 98 mass % or more with respect to a mass of the base body 41, or the base body 41 may be formed of the polyester-based resin alone.

The fact that the polyester-based resin is contained in the base body 41 is confirmed as follows, for example. First, similar to the measurement method for the average thickness of the base body 41, the magnetic tape MT is prepared and cut out at a length of 250 mm to produce a sample, and after that, layers of the sample other than the base body 41 are removed. Next, an IR spectrum of the sample (base body 41) is acquired by infrared absorption spectrometry (Infrared Absorption Spectrometry: IR). Based on this IR spectrum, the fact that the polyester-based resin is contained in the base body 41 can be confirmed.

It is favorable for the base body 41 to contain the polyester-based resin. By the base body 41 containing the polyester-based resin, a Young's modulus in the longitudinal direction of the base body 41 can be reduced to favorably 2.5 GPa or more and 7.8 GPa or less, more favorably 3.0 GPa or more and 7.0 GPa or less. Accordingly, the width of the magnetic tape MT can be maintained constant or almost constant by adjusting the tension applied in the longitudinal direction of the magnetic tape MT during running by the recording/reproducing device. A measurement method for the Young's modulus in the longitudinal direction of the base body 41 will be described later.

The base body 41 may contain resin other than the polyester-based resin. In this case, the resin other than the polyester-based resin may be the main component of the constituent materials of the base body 41. When the resin other than the polyester-based resin is the main component of the constituent materials of the base body 41, a content percentage of the resin other than the polyester-based resin in the base body 41 may be, for example, 50 mass % or more, 60 mass % or more, 70 mass % or more, 80 mass % or more, 90 mass % or more, 95 mass % or more, or 98 mass % or more with respect to the mass of the base body 41, or the base body 41 may be formed of only the resin other than the polyester-based resin. The resin other than the polyester-based resin includes, for example, at least one type selected from the group consisting of a polyolefin-based resin, a cellulose derivative, a vinyl-based resin, and other polymer resins. When the base body 41 contains two or more types of these resins, those two or more types of materials may be mixed, copolymerized, or laminated.

The polyolefin-based resin includes, for example, at least one type selected from the group consisting of PE (polyethylene) and PP (polypropylene). The cellulose derivative includes, for example, at least one type selected from the group consisting of cellulose diacetate, cellulose triacetate, CAB (cellulose acetate butyrate), and CAP (cellulose acetate propionate). The vinyl-based resin includes, for example, at least one type selected from the group consisting of PVC (polyvinyl chloride) and PVDC (polyvinylidene chloride).

The other polymer resins include, for example, at least one type selected from the group consisting of PEEK (polyether etherketone), PA (polyamide, nylon), aromatic PA (aromatic polyamide, aramid), PI (polyimide), aromatic PI (aromatic polyimide), PAI (polyamide imide), aromatic PAI (aromatic polyamide imide), PBO (polybenzoxazole; for example, Zylon®), polyether, PEK (polyether ketone), polyether ester, PES (polyether sulfone), PEI (polyetherimide), PSF (polysulfone), PPS (polyphenylene sulfide), PC (polycarbonate), PAR (polyarylate), and PU (polyurethane). Specifically, for example, the base body 41 may contain, as the main component, PEEK (polyether etherketone), PA (polyamide, nylon), aromatic PA (aromatic polyamide, aramid), PI (polyimide), aromatic PI (aromatic polyimide), PAI (polyamide imide), aromatic PAI (aromatic polyamide imide), PBO (polybenzoxazole; for example, Zylon®), polyether, PEK (polyether ketone), polyether ester, PES (polyether sulfone), PEI (polyetherimide), PSF (polysulfone), PPS (polyphenylene sulfide), PC (polycarbonate), PAR (polyarylate), or PU (polyurethane).

The base body 41 may be biaxially stretched in the longitudinal direction and the width direction. It is favorable for the polymer resin contained in the base body 41 to be oriented in an oblique direction with respect to the width direction of the base body 41.

(Magnetic Layer)

The magnetic layer 43 is configured to be capable of recording signals by magnetization patterns. The magnetic layer 43 may be a vertical-recording-type recording layer, or may be a longitudinal-recording-type recording layer. The magnetic layer 43 contains, for example, magnetic particles and a binding agent. The magnetic layer 43 may further contain, as necessary, at least one type of additive selected from the group consisting of conductive particles, abrasive particles, a lubricant, a curing agent, a rust inhibitor, non-magnetic reinforcement particles, and the like. The magnetic layer 43 may include a plurality of protrusions 430 on a surface on the magnetic layer 43 side (hereinafter, will be referred to as "magnetic surface" as appropriate). The plurality of protrusions 430 are formed by, for example, the conductive particles, the abrasive particles, and the like protruding from the magnetic surface.

Figure 4:
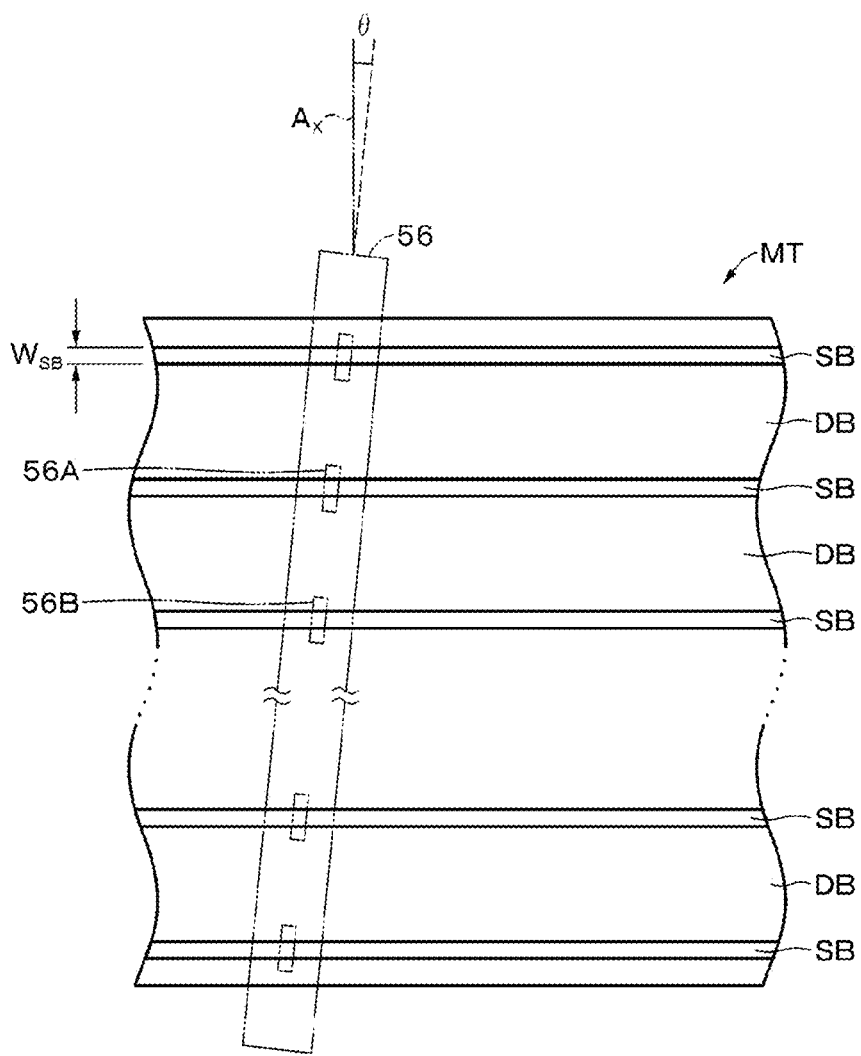
FIG. 4 is a schematic diagram showing an exemplary layout of data bands and servo bands.

As shown in FIG. 4, the magnetic layer 43 may include in advance a plurality of servo bands SB and a plurality of data bands DB. The plurality of servo bands SB are provided at regular intervals along the width direction of the magnetic tape MT. The data band DB is provided between the adjacent servo bands SB. The servo band SB is used for guiding a head unit (magnetic head) 56 (specifically, servo read heads 56A and 56B) during data recording or reproduction. A servo pattern (servo signals) for performing tracking control of the head unit 56 is written in advance in the servo band SB. User data is recorded in the data band DB.

For reading asymmetric servo stripes 113 (see FIG. 6) to be described later, the head unit 56 may be configured to be capable of being maintained obliquely with respect to an axis Ax parallel to the width direction of the magnetic tape MT during data recording and reproduction as shown in FIG. 4. Alternatively, the head unit 56 may be configured to become oblique with respect to the axis Ax following meandering or deformation of the magnetic tape MT during data recording and reproduction. A tilt angle of the head unit 56 that uses the axis Ax parallel to the width direction of the magnetic tape MT as a reference is favorably 3° or more and 18° or less, more favorably 5° or more and 15° or less.

An upper limit value of a ratio $R_s$ ($=(S_{SB}/S) \times 100$) of a total area $S_{SB}$ of the plurality of servo bands SB to an area S of the magnetic surface (a surface on the magnetic layer 43 side) is favorably 4.0% or less, more favorably 3.5% or less, further more favorably 3.0% or less from a viewpoint of securing a high recording capacity. On the other hand, a lower limit value of the ratio $R_s$ of the total area $S_{SB}$ of the plurality of servo bands SB to the area S of the magnetic surface is favorably 1.0% or more from a viewpoint of securing five or more servo bands SB.

The ratio $R_s$ of the total area $S_{SB}$ of the plurality of servo bands SB to the area S of the entire magnetic surface is obtained as follows. The magnetic tape MT is developed using ferricolloid developer (SigMarker Q manufactured by SIGMA HI-CHEMICAL, INC.), and after that, the developed magnetic tape MT is observed with an optical microscope, to measure a servo band width $W_{SB}$ and the number of servo bands SB. Next, the ratio $R_s$ is obtained from the following equation.

$$\text{Ratio } R_s \text{ [\%]} = ((\text{servo band width } W_{SB}) \times (\text{number of servo bands } SB))/(\text{width of magnetic tape } MT)) \times 100$$

The number of servo bands SB is, for example, 5+4n (provided that n is an integer of 0 or more) or more. The number of servo bands SB is favorably five or more, more favorably nine or more. When the number of servo bands SB is five or more, it is possible to suppress an effect of a dimensional change of the magnetic tape MT in the width direction on the servo signals, and secure stable recording/ reproducing characteristics with less off-tracks. An upper limit value of the number of servo bands SB is not limited in particular and is, for example, 33 or less.

The number of servo bands SB is obtained similarly to the method of calculating the ratio $R_s$ described above.

An upper limit value of the servo band width $W_{SB}$ is favorably 95 μm or less, more favorably 65 μm or less, further more favorably 50 μm or less from the viewpoint of securing a high recording capacity. A lower limit value of the servo band width $W_{SB}$ is favorably 10 μm or more. It is difficult to manufacture a magnetic head capable of reading servo signals having the servo band width $W_{SB}$ smaller than 10 μm.

The width of the servo band width $W_{SB}$ is obtained similarly to the method of calculating the ratio $R_s$ described above.

Figure 5:
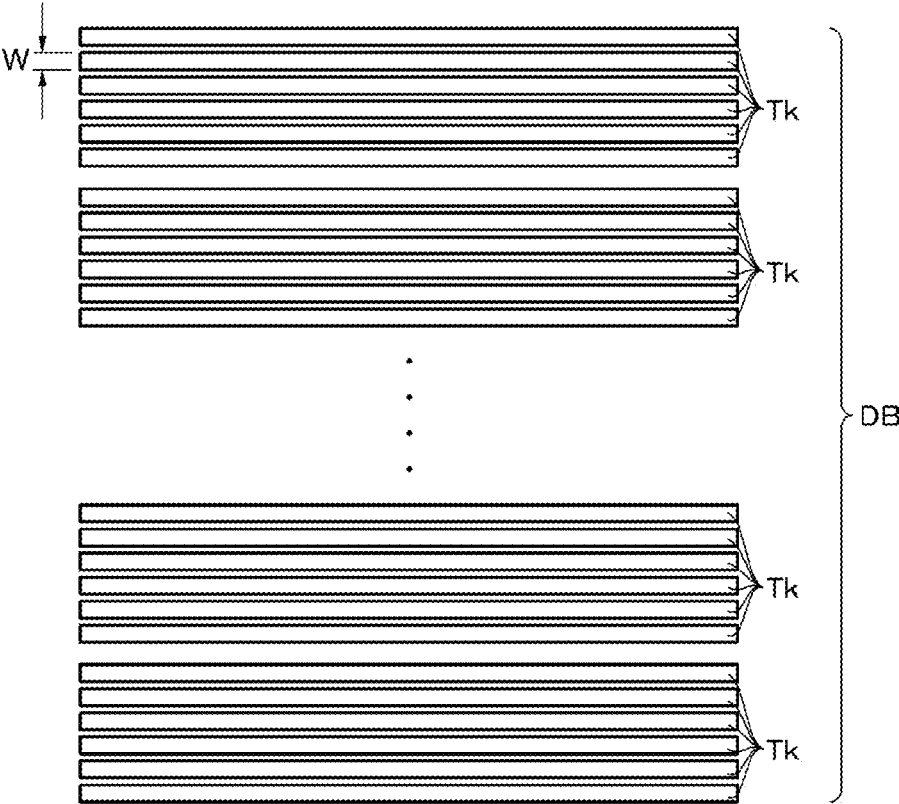
FIG. 5 is an enlarged view showing an exemplary configuration of the data band.

As shown in FIG. 5, the magnetic layer 43 is configured such that a plurality of data tracks Tk can be formed in the data band DB. An upper limit value of a data track width W is favorably 1200 nm or less, 1000 nm or less, 850 nm or less, or 800 nm or less, particularly favorably 600 nm or less from a viewpoint of improving a track recording density and securing a high recording capacity. A lower limit value of the data track width W is favorably 20 nm or more in view of a magnetic particle size.

The data track width W is obtained as follows. First, the cartridge 10 in which data is recorded onto an entire surface of the magnetic tape MT is prepared, the magnetic tape MT is unwound from this cartridge 10, and the magnetic tape MT is cut out at a length of 250 mm at a position that is 30 m to 40 m in the longitudinal direction from one end of the magnetic tape MT on the outer circumferential side, to thus produce a sample. Subsequently, a data recording pattern of a data band DB portion of the magnetic layer 43 of the sample is observed using a magnetic force microscope (Magnetic Force Microscope: MFM) to obtain an MFM image. As the MFM, Dimension 3100 and analysis software therefor manufactured by Digital Instruments are used. A measurement area of the MFM image is 10 μm×10 μm, and the 10 μm×10 μm measurement area is divided into 512×512 (=262, 144) measurement points. The measurement using the MFM is performed for three 10 μm×10 μm measurement areas at different locations, that is, three MFM images are obtained. The track width is measured at 10 positions in each of the obtained three MFM images to acquire measurement values at a total of 30 positions, and an average value (simple average) of the measurement values at the 30 positions is calculated. The average value is the data track width W. The analysis software accompanying Dimension 3100 is used for the measurement of the track width. It is noted that measurement conditions of the MFM are a sweep speed: 1 Hz, a used chip: MFMR-20, a lift height: 20 nm, and correction: Flatten order 3.

The magnetic layer 43 is configured to be capable of recording data such that a minimum value $L_{min}$ of a distance between magnetization reversals becomes favorably 47 nm or less, more favorably 44 nm or less, further more favorably 42 nm or less, particularly favorably 40 nm or less from the viewpoint of securing a high recording capacity. A lower limit value of the minimum value $L_{min}$ of the distance between magnetization reversals is favorably 20 nm or more in view of the magnetic particle size.

The minimum value $L_{min}$ of the distance between magnetization reversals is obtained as follows. First, a sample is produced similarly to the measurement method for the data track width W. Subsequently, a data recording pattern of a data band DB portion of the magnetic layer 43 of the sample is observed using the magnetic force microscope (Magnetic Force Microscope: MFM) to obtain an MFM image. As the MFM, Dimension 3100 and analysis software therefor manufactured by Digital Instruments are used. A measurement area of the MFM image is 2 μm×2 μm, and the 2 μm×2 μm measurement area is divided into 512×512 (=262, 144) measurement points. The measurement using the MFM is performed for three 2 μm×2 μm measurement areas at different locations, that is, three MFM images are obtained. 50 inter-bit distances are measured from a 2D unevenness chart of the recording patterns of the obtained MFM images. The analysis software accompanying Dimension 3100 is used for the measurement of the inter-bit distances. A value that approximately becomes a largest common factor for the 50 inter-bit distances that have been measured is set as the minimum value $L_{min}$ of the distance between magnetization reversals. It is noted that measurement conditions are the sweep speed: 1 Hz, the used chip: MFMR-20, the lift height: 20 nm, and the correction: Flatten order 3.

A bit length $L_{bit}$ of signals recorded in the data band DB is favorably 47 nm or less or 46 nm or less, more favorably 44 nm or less, further more favorably 42 nm, particularly favorably 40 nm or less from the viewpoint of improving the recording density of the magnetic tape MT.

The bit length $L_{bit}$ of signals recorded in the data band DB is obtained similarly to the measurement method for the minimum value $L_{min}$ of the distance between magnetization reversals.

A bit area of the signals recorded in the data band DB is favorably 53000 nm$^2$ or less, more favorably 45000 nm$^2$ or less, further more favorably 37000 nm$^2$ or less, particularly favorably 30000 nm$^2$ or less from the viewpoint of improving the recording density of the magnetic tape MT.

The bit area of the signals recorded in the data band DB is obtained as follows. First, three MFM images are obtained similarly to the measurement method for the data track width W. Next, the data track width W and the bit length $L_{bit}$ are obtained similarly to the measurement method for the data track width W and the measurement method for the bit length $L_{bit}$. Next, using the data track width W and the bit length $L_{bit}$, the bit area (W×$L_{bit}$) of the signals recorded in the data band DB is obtained.

The servo pattern is a magnetization area and is formed by magnetizing a specific area of the magnetic layer 43 in a specific direction by a servo write head at a time of manufacturing the magnetic tape. Of the servo band SB, an area not formed with the servo pattern (hereinafter, will be referred to as "non-pattern area") may be a magnetization area where the magnetic layer 43 is magnetized, or may be a non-magnetization area where the magnetic layer 43 is not magnetized. When the non-pattern area is the magnetization area, the servo pattern forming area and the non-pattern area are magnetized in different directions (for example, opposite directions).

Figure 6:
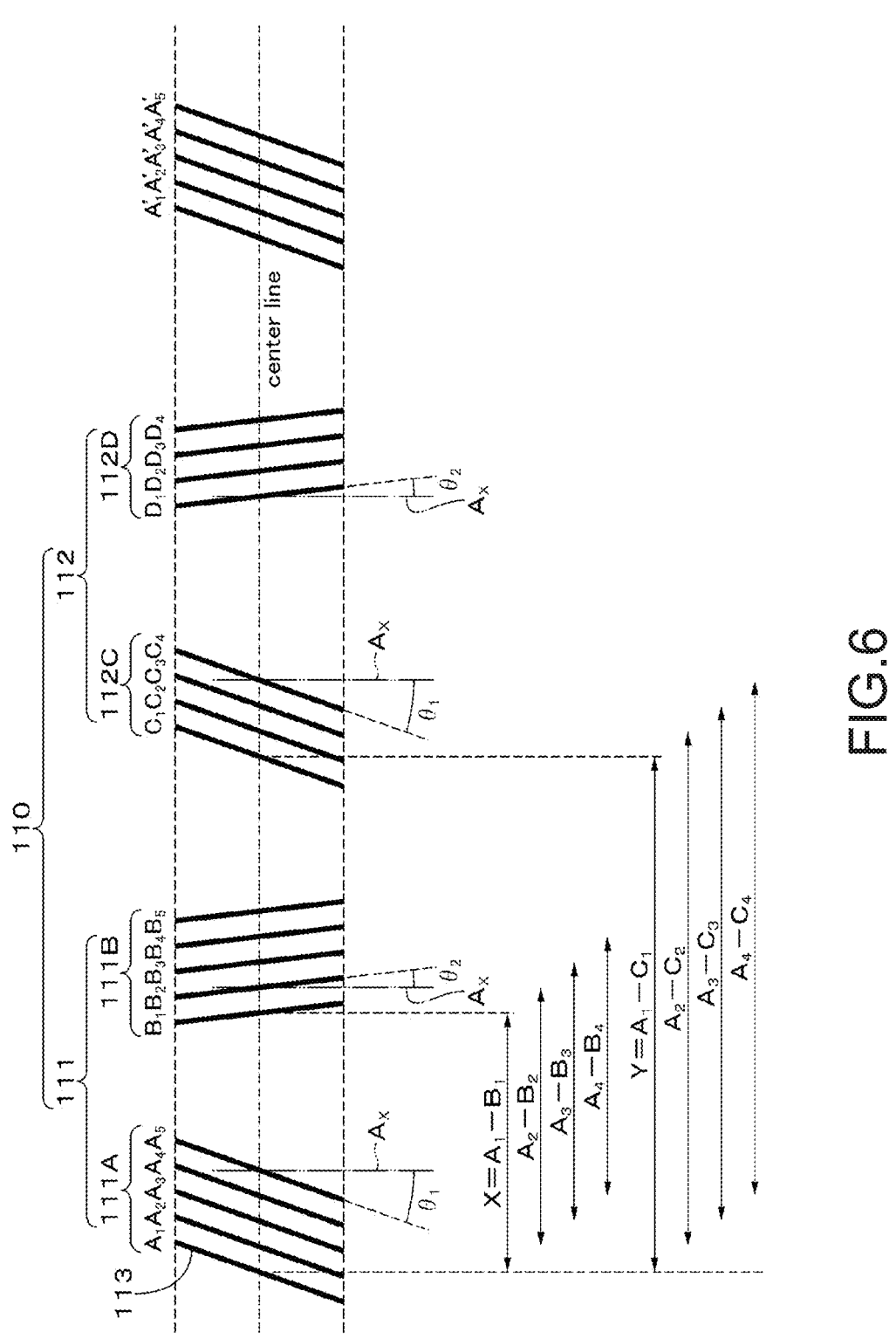
FIG. 6 is an enlarged view showing an exemplary configuration of the servo band.

According to the LTO standard, a servo pattern constituted of a plurality of servo stripes (linear magnetization areas) 113 that are tilted with respect to the axis Ax parallel to the width direction of the magnetic tape MT is formed in the servo band SB as shown in FIG. 6.

The servo band SB includes a plurality of servo frames 110. Each of the servo frames 110 is constituted of 18 servo stripes 113. Specifically, each of the servo frames 110 is constituted of a servo sub-frame 1 (111) and a servo sub-frame 2 (112).

The servo sub-frame 1 (111) is constituted of an A burst 111A and a B burst 111B. The B burst 111B is arranged next to the A burst 111A. The A burst 111A includes five servo stripes 113 formed at specified intervals while being tilted at a predetermined angle $\theta_1$ with respect to the axis Ax parallel to the width direction of the magnetic tape MT. In FIG. 6, symbols $A_1$, $A_2$, $A_3$, $A_4$, and As are respectively allocated to these five servo stripes 113 from an EOT (End Of Tape) toward a BOT (Beginning Of Tape) of the magnetic tape MT.

The B burst 111B includes five servo stripes 113 formed at specified intervals while being tilted at a predetermined angle $\theta_2$ with respect to the axis Ax parallel to the width direction of the magnetic tape MT. In FIG. 6, symbols $B_1$, $B_2$, $B_3$, $B_4$, and $B_5$ are respectively allocated to these five servo stripes 113 from the EOT toward the BOT of the magnetic tape MT.

The servo stripes 113 of the B burst 111B are tilted in the opposite direction from the servo stripes 113 of the A burst 111A. The servo stripes 113 of the A burst 111A and the servo stripes 113 of the B burst 111B are asymmetric with respect to the axis Ax parallel to the width direction of the magnetic tape MT. Specifically, the servo stripes 113 of the A burst 111A and the servo stripes 113 of the B burst 111B are arranged substantially in an inverted V shape. By the asymmetricity of the servo stripes 113 of the A burst 111A and the servo stripes 113 of the B burst 111B with respect to the axis Ax, there exists a state where the servo stripes 113 of the A burst 111A and the servo stripes 113 of the B burst 111B become substantially symmetric with respect to a center axis of a sliding surface of the head unit 56 when the head unit 56 is tilted obliquely with respect to the axis Ax. By changing the tilt of the head unit 56 while using this state as a reference, it becomes possible to adjust a distance between the servo read heads 56A and 56B in the width direction of the magnetic tape MT. Accordingly, in both of a case where the width of the magnetic tape MT is increased and a case where the width of the magnetic tape MT is reduced, the servo read heads 56A and 56B can be made to respectively oppose specified positions of the servo band SB. It is noted that the center axis of the sliding surface of the head unit 56 refers to an axis that passes through a center of the plurality of servo read heads 56A and 56B on the sliding surface of the head unit 56.

The predetermined angle $\theta_1$ that is the tilt angle of the servo stripes 113 of the A burst 111A and the predetermined angle $\theta_2$ that is the tilt angle of the servo stripes 113 of the B burst 111B differ. More specifically, the predetermined angle $\theta_1$ of the servo stripes 113 of the A burst 111A may be larger than the predetermined angle $\theta_2$ of the servo stripes 113 of the B burst 111B, or the predetermined angle $\theta_2$ of the servo stripes 113 of the B burst 111B may be larger than predetermined angle $\theta_1$ of the servo stripes 113 of the A burst 111A. In other words, the tilt of the servo stripes 113 of the A burst 111A may be larger than the tilt of the servo stripes 113 of the B burst 111B, or the tilt of the servo stripes 113 of the B burst 111B may be larger than the tilt of the servo stripes 113 of the A burst 111A. It is noted that FIG. 6 shows the example where the predetermined angle $\theta_1$ of the servo stripes 113 of the A burst 111A is larger than the predetermined angle $\theta_2$ of the servo stripes 113 of the B burst 111B. Hereinafter, descriptions will be give on the case where the predetermined angle $\theta_1$ of the servo stripes 113 of the A burst

111A is larger than the predetermined angle $\theta_2$ of the servo stripes 113 of the B burst 111B.

The servo sub-frame 2 (112) is constituted of a C burst 112C and a D burst 112D. The D burst 112D is arranged next to the C burst 112C. The C burst 112C includes four servo stripes 113 formed at specified intervals while being tilted at the predetermined angle $\theta_1$ with respect to the axis Ax parallel to the width direction of the magnetic tape MT. In FIG. 6, symbols $C_1$, $C_2$, $C_3$, and $C_4$, are respectively allocated to these four servo stripes 113 from the EOT toward the BOT of the magnetic tape MT.

The D burst 112D includes four servo stripes 113 formed at specified intervals while being tilted at the predetermined angle $\theta_2$ with respect to the axis Ax parallel to the width direction of the magnetic tape MT. In FIG. 6, symbols $D_1$, $D_2$, $D_3$, and $D_4$, are respectively allocated to these four servo stripes 113 from the EOT toward the BOT of the magnetic tape MT.

The servo stripes 113 of the D burst 112D are tilted in the opposite direction from the servo stripes 113 of the C burst 112C. The servo stripes 113 of the C burst 112C and the servo stripes 113 of the D burst 112D are asymmetric with respect to the axis Ax parallel to the width direction of the magnetic tape MT. Specifically, the servo stripes 113 of the C burst 112C and the servo stripes 113 of the D burst 112D are arranged substantially in the inverted V shape. By the asymmetricity of the servo stripes 113 of the C burst 112C and the servo stripes 113 of the D burst 112D with respect to the axis Ax, there exists a state where the servo stripes 113 of the C burst 112C and the servo stripes 113 of the D burst 112D become substantially symmetric with respect to the center axis of the head unit 56 when the head unit 56 is tilted obliquely with respect to the axis Ax. By changing the tilt of the head unit 56 while using this state as a reference, it becomes possible to adjust the inter-servo distance.

The predetermined angle $\theta_1$ that is the tilt angle of the servo stripes 113 of the C burst 112C and the predetermined angle $\theta_2$ that is the tilt angle of the servo stripes 113 of the D burst 112D differ. More specifically, the predetermined angle $\theta_1$ of the servo stripes 113 of the C burst 112C may be larger than the predetermined angle $\theta_2$ of the servo stripes 113 of the D burst 112D, or the predetermined angle $\theta_2$ of the servo stripes 113 of the D burst 112D may be larger than predetermined angle $\theta_1$ of the servo stripes 113 of the C burst 112C. In other words, the tilt of the servo stripes 113 of the C burst 112C may be larger than the tilt of the servo stripes 113 of the D burst 112D, or the tilt of the servo stripes 113 of the D burst 112D may be larger than the tilt of the servo stripes 113 of the C burst 112C. It is noted that FIG. 6 shows the example where the predetermined angle $\theta_1$ of the servo stripes 113 of the C burst 112C is larger than the predetermined angle $\theta_2$ of the servo stripes 113 of the D burst 112D. Hereinafter, descriptions will be give on the case where the predetermined angle $\theta_1$ of the servo stripes 113 of the C burst 112C is larger than the predetermined angle $\theta_2$ of the servo stripes 113 of the D burst 112D.

The predetermined angle $\theta_1$ of the servo stripes 113 in the A burst 111A and the C burst 112C is favorably 18° or more and 28° or less, more favorably 18° or more and 26° or less. The predetermined angle $\theta_2$ of the servo stripes 113 in the B burst 111B and the D burst 112D is favorably −4° or more and 6° or less, more favorably −2° or more and 6° or less. The servo stripes 113 in the A burst 111A and the C burst 112C are an example of first magnetization areas. The servo stripes 113 in the B burst 111B and the D burst 112D are an example of second magnetization areas.

By reading the servo band SB by the head unit 56, information for acquiring a tape speed and a position of the head unit 56 in the longitudinal direction can be obtained. The tape speed is calculated from times among four timing signals (A1-C1, A2-C2, A3-C3, A4-C4). A head position is calculated from the times among the four timing signals described above and times among four other timing signals (A1-B1, A2-B2, A3-B3, A4-B4). The servo pattern may be of a shape including two parallel lines.

As shown in FIG. 6, it is favorable for the servo pattern (that is, the plurality of servo stripes 113) to be arrayed linearly in the longitudinal direction of the magnetic tape MT. In other words, it is favorable for the servo band SB to have a linear shape in the longitudinal direction of the magnetic tape MT.

An upper limit value of an average thickness $t_1$ of the magnetic layer 43 is favorably 0.08 µm or less, more favorably 0.065 µm or less, further more favorably 0.055 µm or less. When the upper limit value of the average thickness $t_1$ of the magnetic layer 43 is 0.08 µm or less, an effect of a demagnetization field can be reduced when a ring-type head is used as the recording head, and thus excellent electromagnetic conversion characteristics can be obtained.

A lower limit value of the average thickness $t_1$ of the magnetic layer 43 is favorably 0.035 µm or more. When the lower limit value of the average thickness $t_1$ of the magnetic layer 43 is 0.035 µm or more, an output can be secured when an MR-type head is used as the reproducing head, and thus excellent electromagnetic conversion characteristics can be obtained.

The average thickness $t_1$ of the magnetic layer 43 is obtained as follows. First, the magnetic tape MT accommodated in the cartridge 10 is unwound, and the magnetic tape MT is cut out at a length of 250 mm at each of a position that is 10 m to 20 m, a position that is 30 m to 40 m, and a position that is 50 m to 60 m in the longitudinal direction from one end of the magnetic tape MT on the outer circumferential side, to thus produce three samples. Subsequently, each sample is processed and sectioned by an FIB method or the like. When using the FIB method, a carbon layer and a tungsten layer are formed as protective films as preprocessing for observing a TEM image of a cross section to be described later. The carbon layer is formed on the surface of the magnetic tape MT on the magnetic layer 43 side and the surface thereof on the back layer 44 side by a vapor deposition method, and then the tungsten layer is further formed on the surface on the magnetic layer 43 side by the vapor deposition method or a sputtering method. The sectioning is performed along the longitudinal direction of the magnetic tape MT. In other words, by the sectioning, a cross section parallel to both the longitudinal direction and thickness direction of the magnetic tape MT is formed.

The cross section of each of the obtained sectioned samples is observed using a transmission electron microscope (Transmission Electron Microscope: TEM) under the following conditions to obtain a TEM image of each of the sectioned samples. It is noted that a magnification and an acceleration voltage may be adjusted as appropriate depending on a type of the device.

Device: TEM (H9000NAR manufactured by Hitachi,
        Ltd.)
    Acceleration voltage: 300 kV
    Magnification: 100,000 folds
Next, using the obtained TEM image of each of the sectioned samples, the thickness of the magnetic layer 43 is measured at 10 positions in each of the sectioned samples. It is noted that the 10 measurement positions in each of the sectioned samples are randomly selected from the sample such that positions thereof differ in the longitudinal direction of the magnetic tape MT. An average value obtained by simply averaging (arithmetic average) the obtained measurement values of each of the sectioned samples (the thicknesses of the magnetic layer 43 at a total of 30 positions) is set as the average thickness $t_1$ [nm] of the magnetic layer 43.

(Magnetic Particles)

For example, the magnetic particles are particles containing hexagonal ferrite (hereinafter, will be referred to as "hexagonal ferrite particles"), particles containing epsilon iron oxide (ε iron oxide) (hereinafter, will be referred to as "ε iron oxide particles"), or particles containing Co-containing spinel ferrite (hereinafter, will be referred to as "cobalt ferrite particles"). It is favorable for the magnetic particles to have a crystalline orientation preferentially in a vertical direction of the magnetic tape MT. In the present specification, the vertical direction (thickness direction) of the magnetic tape MT refers to a thickness direction of the magnetic tape MT in a planar state.

(Hexagonal Ferrite Particles)

The hexagonal ferrite particles have, for example, a plate shape such as a hexagonal plate shape or a column shape such as a hexagonal column shape (provided that a thickness or height is smaller than a long diameter of a plate surface or bottom surface). In the present specification, the hexagonal plate shape includes a substantially hexagonal plate shape. Hexagonal ferrite favorably includes at least one type selected from Ba, Sr, Pb, and Ca, or more favorably includes at least one type selected from Ba and Sr. Specifically, for example, hexagonal ferrite may be barium ferrite or strontium ferrite. Barium ferrite may further include at least one type selected from Sr, Pb, and Ca in addition to Ba. Strontium ferrite may further include at least one type selected from Ba, Pb, and Ca in addition to Sr.

More specifically, hexagonal ferrite has an average composition expressed by a general formula $MFe_{12}O_{19}$. It is noted that M is, for example, at least one type of metal selected from the group consisting of Ba, Sr, Pb, and Ca, favorably at least one type of metal selected from the group consisting of Ba and Sr. M may be a combination of Ba and at least one type of metal selected from the group consisting of Sr, Pb, and Ca. Alternatively, M may be a combination of Sr and at least one type of metal selected from the group consisting of Ba, Pb, and Ca. A part of Fe in the general formula described above may be substituted by other metal elements.

When the magnetic particles are the hexagonal ferrite particles, an average particle size of the magnetic particles is favorably 13 nm or more and 20 nm or less, more favorably 13 nm or more and 19 nm or less, further more favorably 13 nm or more and 18 nm or less, particularly favorably 14 nm or more and 17 nm or less, most favorably 14 nm or more and 16 nm or less. When the average particle size of the magnetic particles is 20 nm or less, additionally excellent electromagnetic conversion characteristics (for example, SNR) can be obtained in the magnetic tape MT having a high recording density. Meanwhile, when the average particle size of the magnetic particles is 13 nm or more, dispersibility of the magnetic particles is improved, and additionally excellent electromagnetic conversion characteristics (for example, SNR) can be obtained.

When the magnetic particles are the hexagonal ferrite particles, an average aspect ratio of the magnetic particles is favorably 1.0 or more and 3.0 or less, more favorably 1.5 or more and 2.8 or less, further more favorably 1.8 or more and 2.7 or less. When the average aspect ratio of the magnetic particles is within the range of 1.0 or more and 3.0 or less, an agglomeration of the magnetic particles can be suppressed. In addition, resistance applied to the magnetic particles when vertically orienting the magnetic particles in a process of forming the magnetic layer 43 can be suppressed. Accordingly, a vertical orientation of the magnetic particles can be improved.

When the magnetic particles are the hexagonal ferrite particles, the average particle size and average aspect ratio of the magnetic particles are obtained as follows. First, the magnetic tape MT accommodated in the cartridge 10 is unwound, and the magnetic tape MT is cut out at a position that is 30 m to 40 m in the longitudinal direction from one end of the magnetic tape MT on the outer circumferential side. Subsequently, the magnetic tape MT as the measurement target is processed and sectioned by the FIB method or the like. When using the FIB method, a carbon layer and a tungsten layer are formed as protective films as preprocessing for observing a TEM image of a cross section to be described later. The carbon layer is formed on the surface of the magnetic tape MT on the magnetic layer 43 side and the surface thereof on the back layer 44 side by the vapor deposition method, and then the tungsten layer is further formed on the surface on the magnetic layer 43 side by the vapor deposition method or the sputtering method. The sectioning is performed along the length direction (longitudinal direction) of the magnetic tape MT. In other words, by the sectioning, a cross section parallel to both the longitudinal direction and the thickness direction of the magnetic tape MT is formed.

Using a transmission electron microscope (H-9500 manufactured by Hitachi High-Tech Corporation), the cross section of the obtained sectioned sample is subjected to a cross-sectional observation at an acceleration voltage of 200 kV and a total magnification of 500,000 folds in such a manner that the entire magnetic layer 43 is included with respect to the thickness direction of the magnetic layer 43, to thus capture a TEM image. The TEM image is prepared in a number with which 50 particles for which a plate diameter DB and a plate thickness DA (see FIG. 7) described below can be measured can be extracted.

Figure 7:
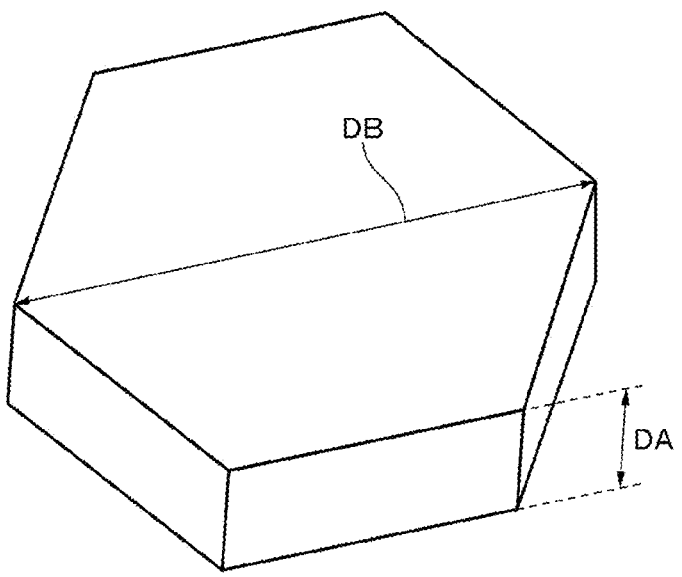
FIG. 7 is a perspective view showing an exemplary shape of a particle.

In the present specification, regarding a size of the hexagonal ferrite particle (hereinafter, will be referred to as "particle size"), when a shape of the particle observed in the TEM image described above is a plate shape or a column shape (provided that the thickness or height is smaller than the long diameter of the plate surface or bottom surface) as shown in FIG. 7, the long diameter of the plate surface or bottom surface is set as a value of the plate diameter DB. A thickness or height of the particle observed in the TEM image described above is set as a value of the plate thickness DA. When the thickness or height of the particle is not constant within the particle observed in the TEM image, a maximum thickness or height of the particle is set as the plate thickness DA.

Next, 50 particles extracted from the captured TEM image are picked out based on the following criteria. A particle that is partially sticking out from a visual field of the TEM image is not measured, and a particle that has a sharp outline and exists in isolation is measured. When the particles overlap, particles in which a boundary between the particles is clear and the shape of the entire particle is determinable are each measured as an independent particle, but particles in which the boundary is unclear and the entire shape of the particle is unclear are not measured assuming that the shape of the particle is undeterminable.

Figure 8:
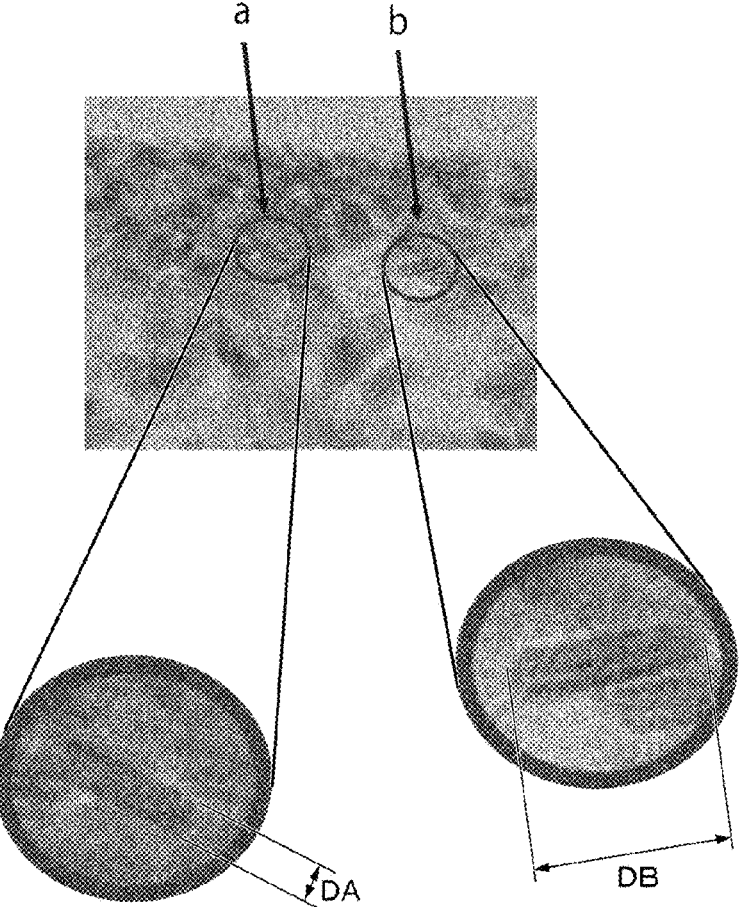
FIG. 8 is a diagram showing a first example of a cross-sectional TEM image of a magnetic layer.
Figure 9:
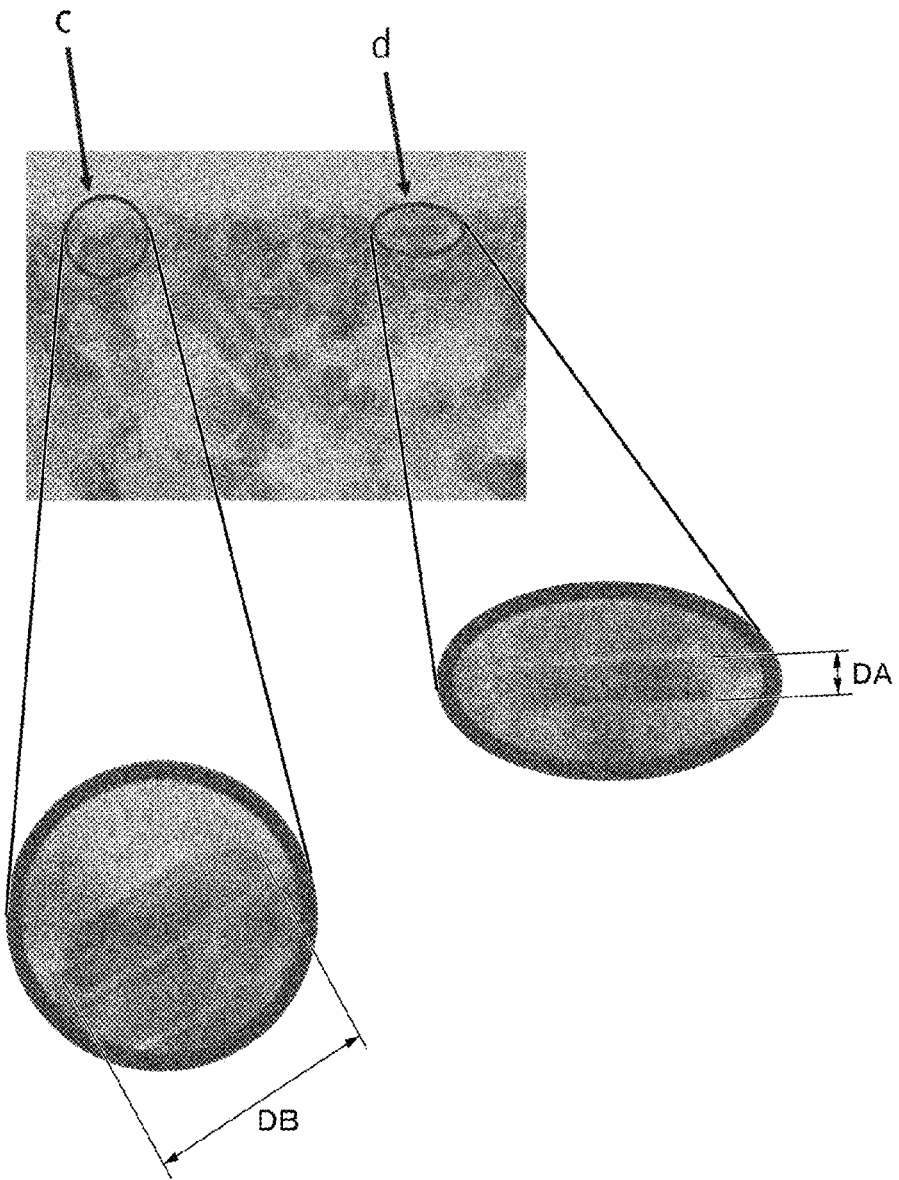
FIG. 9 is a diagram showing a second example of the cross-sectional TEM image of the magnetic layer.

FIGS. 8 and 9 respectively show a first example and second example of the TEM image. In FIGS. 8 and 9, for example, particles respectively indicated by arrows a and d are selected since the plate thicknesses (thicknesses or heights of the particles) DA of the particles can be visibly confirmed. The plate thickness DA of each of the selected 50 particles is measured. The plate thicknesses DA obtained in this manner are simply averaged (arithmetic average) to obtain an average plate thickness $DA_{ave}$. The average plate thickness $DA_{ave}$ is an average particle plate thickness. Subsequently, the plate diameter DB of each of the magnetic particles is measured. For measuring the plate diameter DB of each of the particles, 50 particles whose particle plate diameter DB can be visibly confirmed are picked out from the captured TEM image. In FIGS. 8 and 9, for example, particles respectively indicated by arrows b and c are selected since the plate diameters DB thereof can be visibly confirmed. The plate diameter DB of each of the selected 50 particles is measured. The plate diameters DB obtained in this manner are simply averaged (arithmetic average) to obtain an average plate diameter $DB_{ave}$. The average plate diameter $DB_{ave}$ is an average particle size. Then, an average aspect ratio ($DB_{ave}/DA_{ave}$) of the particles is obtained from the average plate thickness $DA_{ave}$ and the average plate diameter $DB_{ave}$.

When the magnetic particles are the hexagonal ferrite particles, an average particle volume of the magnetic particles is favorably 500 nm³ or more and 2500 nm³ or less, more favorably 500 nm³ or more and 1500 nm³ or less, further more favorably 500 nm³ or more and 1400 nm³ or less, particularly favorably 600 nm³ or more and 1200 nm³ or less, most favorably 600 nm³ or more and 1000 nm³ or less. When the average particle volume of the magnetic particles is 2500 nm³ or less, effects similar to those of a case where the average particle size of the magnetic particles is 22 nm or less can be obtained. Meanwhile, when the average particle volume of the magnetic particles is 500 nm³ or more, effects similar to those of a case where the average particle size of the magnetic particles is 13 nm or more can be obtained.

The average particle volume of the magnetic particles is obtained as follows. First, as described above in relation to the method of calculating the average particle size of the magnetic particles, the average plate thickness $DA_{ave}$ and the average plate diameter $DB_{ave}$ are obtained. Next, an average volume V of the magnetic particles is obtained by the following equation.

$$V = \frac{3\sqrt{3}}{8} \times DA_{ave} \times DB_{ave} \times DB_{ave} \qquad \text{[Equation 1]}$$

(ε Iron Oxide Particles)

The ε iron oxide particles are hard magnetic particles with which a high coercive force can be obtained even with fine particles. The ε iron oxide particles have a spherical shape or a cubic shape. In the present specification, the spherical shape includes a substantially spherical shape. Further, the cubic shape includes a substantially cubic shape. Since the ε iron oxide particles have the shape as described above, when the ε iron oxide particles are used as the magnetic particles, it is possible to reduce a contact area of the particles in the thickness direction of the magnetic tape MT and suppress the agglomeration of the particles as compared to a case where barium ferrite particles having a hexagonal plate shape are used as the magnetic particles. Accordingly, it is possible to enhance dispersibility of the magnetic particles and obtain additionally excellent electromagnetic conversion characteristics (for example, SNR).

The ε iron oxide particles may have a composite particle structure. More specifically, the ε iron oxide particle includes an ε iron oxide portion and a portion having a soft magnetic property or a portion having a magnetic property in which a saturation magnetization amount σs is larger and a coercive force Hc is smaller than those of ε iron oxide (hereinafter, will be referred to as "portion having a soft magnetic property or the like").

The ε iron oxide portion contains ε iron oxide. ε iron oxide contained in the ε iron oxide portion is favorably one having an $\varepsilon$-$Fe_2O_3$ crystal as a main phase, more favorably one constituted of single-phase $\varepsilon$-$Fe_2O_3$.

The portion having a soft magnetic property or the like is partially in contact with at least the ε iron oxide portion. Specifically, the portion having a soft magnetic property or the like may partially cover the ε iron oxide portion, or may cover an entire circumference of the ε iron oxide portion.

The portion having a soft magnetic property (the portion having a magnetic property in which the saturation magnetization amount σs is larger and the coercive force Hc is smaller than those of ε iron oxide) contains, for example, a soft magnetic material such as α-Fe, a Ni—Fe alloy, or an Fe—Si—Al alloy. α-Fe may be obtained by reducing ε iron oxide contained in the ε iron oxide portion.

Further, the portion having a soft magnetic property may contain, for example, $Fe_3O_4$, $\gamma$-$Fe_2O_3$, spinel ferrite, or the like.

By the ε iron oxide particle including the portion having a soft magnetic property or the like as described above, the coercive force Hc of the ε iron oxide particle (composite particle) as a whole can be adjusted to a coercive force Hc suited for recording while maintaining the coercive force Hc of the ε iron oxide portion alone at a large value for securing thermal stability.

The ε iron oxide particle may contain an additive in place of the composite particle structure, or may contain an additive together with the composite particle structure. In this case, a part of Fe in the ε iron oxide particle is substituted by the additive. Also by the ε iron oxide particle containing the additive, the coercive force Hc of the ε iron oxide particle as a whole can be adjusted to a coercive force Hc suited for recording, and thus easiness of recording can be improved. The additive is a metal element other than iron, favorably a trivalent metal element, more favorably at least one type selected from the group consisting of Al, Ga, and In, further more favorably at least one type selected from the group consisting of Al and Ga.

Specifically, ε iron oxide containing the additive is an $\varepsilon$-$Fe_{2-x}M_xO_3$ crystal (provided that: M is a metal element other than iron, favorably a trivalent metal element, more favorably at least one type selected from the group consisting of Al, Ga, and In, further more favorably at least one type selected from the group consisting of Al and Ga; and x is, for example, $0 < x < 1$).

When the magnetic particles are the ε iron oxide particles, the average particle size of the magnetic particles is favorably 10 nm or more and 20 nm or less, more favorably 10 nm or more and 18 nm or less, further more favorably 10 nm or more and 16 nm or less, particularly favorably 10 nm or more and 15 nm or less, most favorably 10 nm or more and 14 nm or less. In the magnetic tape MT, an area of a size that is ½ the recording wavelength becomes the actual magnetization area. Therefore, by setting the average particle size of the magnetic particles to be less than half the shortest recording wavelength, additionally excellent electromagnetic conversion characteristics (for example, SNR) can be obtained. Accordingly, when the average particle size of the magnetic particles is 20 nm or less, additionally excellent electromagnetic conversion characteristics (for example, SNR) can be obtained in the magnetic tape MT having a high recording density (for example, the magnetic tape MT configured to be capable of recording signals at the shortest recording wavelength of 40 nm or less).

Meanwhile, when the average particle size of the magnetic particles is 10 nm or more, dispersibility of the magnetic particles is improved, and additionally excellent electromagnetic conversion characteristics (for example, SNR) can be obtained.

When the magnetic particles are the ε iron oxide particles, the average aspect ratio of the magnetic particles is favorably 1.0 or more and 3.0 or less, more favorably 1.0 or more and 2.5 or less, further more favorably 1.0 or more and 2.1 or less, particularly favorably 1.0 or more and 1.8 or less. When the average aspect ratio of the magnetic particles is within the range of 1.0 or more and 3.0 or less, the agglomeration of the magnetic particles can be suppressed. In addition, resistance applied to the magnetic particles when vertically orienting the magnetic particles in the process of forming the magnetic layer 43 can be suppressed. Accordingly, the vertical orientation of the magnetic particles can be improved.

When the magnetic particles are the ε iron oxide particles, the average particle size and average aspect ratio of the magnetic particles are obtained as follows. First, the magnetic tape MT accommodated in the cartridge 10 is unwound, and the magnetic tape MT is cut out at a position that is 30 m to 40 m in the longitudinal direction from one end of the magnetic tape MT on the outer circumferential side. Subsequently, the magnetic tape MT as the measurement target is processed and sectioned by the FIB (Focused Ion Beam) method or the like. When using the FIB method, a carbon layer and a tungsten layer are formed as protective layers as preprocessing for observing a TEM image of a cross section to be described later. The carbon layer is formed on the surface of the magnetic tape MT on the magnetic layer 43 side and the surface thereof on the back layer 44 side by the vapor deposition method, and then the tungsten layer is further formed on the surface on the magnetic layer 43 side by the vapor deposition method or the sputtering method. The sectioning is performed along the length direction (longitudinal direction) of the magnetic tape MT. In other words, by the sectioning, a cross section parallel to both the longitudinal direction and the thickness direction of the magnetic tape MT is formed.

Using the transmission electron microscope (H-9500 manufactured by Hitachi High-Tech Corporation), the cross section of the obtained sectioned sample is subjected to a cross-sectional observation at an acceleration voltage of 200 kV and a total magnification of 500,000 folds in such a manner that the entire magnetic layer 43 is included with respect to the thickness direction of the magnetic layer 43, to thus capture a TEM image. Next, from the captured TEM image, 50 particles whose particle shapes can be visibly confirmed are picked out, and a long axis length DL and short axis length DS of each particle are measured. Herein, the long axis length DL refers to a maximum distance (so-called maximum Feret's diameter) out of distances among two parallel lines drawn from various angles so as to come into contact with an outline of each of the particles. On the other hand, the short axis length DS refers to a maximum length out of lengths of a particle in a direction orthogonal to the long axis (DL) of the particle. Subsequently, the measured long axis lengths DL of the 50 particles are simply averaged (arithmetic average) to obtain an average long axis length $DL_{ave}$. The average long axis length $DL_{ave}$ obtained in this manner is set as the average particle size of the magnetic particles. Further, the measured short axis lengths DS of the 50 particles are simply averaged (arithmetic average) to obtain an average short axis length $DS_{ave}$. Then, an average aspect ratio ($DL_{ave}/DS_{ave}$) of the particles is obtained from the average long axis length $DL_{ave}$ and the average short axis length $DS_{ave}$.

When the magnetic particles are the ε iron oxide particles, the average particle volume of the magnetic particles is favorably 500 nm³ or more and 4000 nm³ or less, more favorably 500 nm³ or more and 3000 nm³ or less, further more favorably 500 nm³ or more and 2000 nm³ or less, particularly favorably 600 nm³ or more and 1600 nm³ or less, most favorably 600 nm³ or more and 1300 nm³ or less. Since noises of the magnetic tape MT are inversely proportional to a square root of the number of particles (that is, proportional to a square root of a particle volume) in general, additionally excellent electromagnetic conversion characteristics (for example, SNR) can be obtained by further reducing the particle volume. Accordingly, when the average particle volume of the magnetic particles is 4000 nm³ or less, additionally excellent electromagnetic conversion characteristics (for example, SNR) can be obtained similar to the case where the average particle size of the magnetic particles is 20 nm or less. Meanwhile, when the average particle volume of the magnetic particles is 500 nm³ or more, effects similar to those of the case where the average particle size of the magnetic particles is 10 nm or more can be obtained.

When the ε iron oxide particle has a spherical shape, the average particle volume of the magnetic particles is obtained as follows. First, the average long axis length $DL_{ave}$ is obtained similarly to the method of calculating the average particle size of the magnetic particles described above. Next, the average volume V of the magnetic particles is obtained by the following equation.

$$V = (\pi/6) \times DL_{ave}^3$$

When the ε iron oxide particle has a cubic shape, the average volume of the magnetic particles is obtained as follows. First, the magnetic tape MT accommodated in the cartridge 10 is unwound, and the magnetic tape MT is cut out at a position that is 30 m to 40 m in the longitudinal direction from one end of the magnetic tape MT on the outer circumferential side. Subsequently, the cut-out magnetic tape MT is processed and sectioned by the FIB (Focused Ion Beam) method or the like. When using the FIB method, a carbon film and a tungsten thin film are formed as protective films as preprocessing for observing a TEM image of a cross section to be described later. The carbon film is formed on the surface of the magnetic tape MT on the magnetic layer 43 side and the surface thereof on the back layer 44 side by the vapor deposition method, and then the tungsten thin film is further formed on the surface on the magnetic layer 43 side by the vapor deposition method or the sputtering method. The sectioning is performed along the length direction (longitudinal direction) of the magnetic tape MT. In other words, by the sectioning, a cross section parallel to both the longitudinal direction and the thickness direction of the magnetic tape MT is formed.

Using the transmission electron microscope (H-9500 manufactured by Hitachi High-Tech Corporation), the obtained sectioned sample is subjected to a cross-sectional observation at an acceleration voltage of 200 kV and a total magnification of 500,000 folds in such a manner that the entire magnetic layer 43 is included with respect to the thickness direction of the magnetic layer 43, to thus obtain a TEM image. It is noted that the magnification and acceleration voltage may be adjusted as appropriate in accordance with the type of the device. Next, from the captured TEM image, 50 particles whose particle shapes can be visibly confirmed are picked out, and a side length DC of each particle is measured. Subsequently, the measured side lengths DC of the 50 particles are simply averaged (arithmetic average) to obtain an average side length $DC_{ave}$. Next, an average volume $V_{ave}$ (particle volume) of the magnetic particles is obtained by the following equation using the average side length $DC_{ave}$.

$$V_{ave} = DC_{ave}^3$$

(Cobalt Ferrite Particles)

It is favorable for the cobalt ferrite particles to have a uniaxial crystal anisotropy. By the uniaxial crystal anisotropy of the cobalt ferrite particles, the magnetic particles can have a crystalline orientation preferentially in the vertical direction of the magnetic tape MT. The cobalt ferrite particles have, for example, a cubic shape. In the present specification, the cubic shape includes a substantially cubic shape. Co-containing spinel ferrite may further include at least one type selected from the group consisting of Ni, Mn, Al, Cu, and Zn in addition to Co.

Co-containing spinel ferrite has an average composition expressed by the following formula, for example.

$$Co_xM_yFe_2O_z$$

(provided that in the formula, M is, for example, at least one type of metal selected from the group consisting of Ni, Mn, Al, Cu, and Zn, x is a value within the range of $0.4 \leq x \leq 1.0$, and y is a value within the range of $0 \leq y \leq 0.3$; and provided that x and y satisfy a relationship of $(x+y) \leq 1.0$, z is a value within the range of $3 \leq z \leq 4$, and a part of Fe may be substituted by other metal elements.)

When the magnetic particles are the cobalt ferrite particles, the average particle size of the magnetic particles is favorably 8 nm or more and 16 nm or less, more favorably 8 nm or more and 13 nm or less, further more favorably 8 nm or more and 10 nm or less. When the average particle size of the magnetic particles is 16 nm or less, additionally excellent electromagnetic conversion characteristics (for example, SNR) can be obtained in the magnetic tape MT having a high recording density. Meanwhile, when the average particle size of the magnetic particles is 8 nm or more, dispersibility of the magnetic particles is additionally improved, and additionally excellent electromagnetic conversion characteristics (for example, SNR) can be obtained. The method of calculating the average particle size of the magnetic particles is similar to the method of calculating the average particle size of the magnetic particles in the case where the magnetic particles are the ε iron oxide particles.

When the magnetic particles are the cobalt ferrite particles, the average aspect ratio of the magnetic particles is favorably 1.0 or more and 3.0 or less, more favorably 1.0 or more and 2.5 or less, further more favorably 1.0 or more and 2.0 or less. When the average aspect ratio of the magnetic particles is within the range of 1.0 or more and 3.0 or less, the agglomeration of the magnetic particles can be suppressed. In addition, resistance applied to the magnetic particles when vertically orienting the magnetic particles in the process of forming the magnetic layer 43 can be suppressed. Accordingly, the vertical orientation of the magnetic particles can be improved. The method of calculating the average aspect ratio of the magnetic particles is similar to the method of calculating the average aspect ratio of the magnetic particles in the case where the magnetic particles are the ε iron oxide particles.

When the magnetic particles are the cobalt ferrite particles, the average particle volume of the magnetic particles is favorably 500 $nm^3$ or more and 4000 $nm^3$ or less, more favorably 600 $nm^3$ or more and 2000 $nm^3$ or less, further more favorably 600 $nm^3$ or more and 1000 $nm^3$ or less. When the average particle volume of the magnetic particles is 4000 $nm^3$ or less, effects similar to those of the case where the average particle size of the magnetic particles is 16 nm or less can be obtained. Meanwhile, when the average particle volume of the magnetic particles is 500 $nm^3$ or more, effects similar to those of the case where the average particle size of the magnetic particles is 8 nm or more can be obtained. The method of calculating the average particle volume of the magnetic particles is similar to the method of calculating the average particle volume in the case where the ε iron oxide particles have a cubic shape.

(Binding Agent)

The binding agent contains, for example, a thermoplastic resin. The binding agent may further contain a thermoset resin, a reactive resin, or the like.

The thermoplastic resin includes a first thermoplastic resin containing chlorine atoms (first binding agent) and a second thermoplastic resin containing nitrogen atoms (second binding agent). More specifically, the thermoplastic resin includes a vinyl chloride-based resin and a urethane-based resin. In the present specification, the vinyl chloride-based resin refers to a polymer including a structural unit deriving from vinyl chloride. More specifically, for example, the vinyl chloride-based resin refers to a homopolymer of vinyl chloride, a polymer of vinyl chloride and a comonomer that can be copolymerized with this, and a mixture of these polymers.

The vinyl chloride-based resin includes, for example, at least one type selected from the group consisting of vinyl chloride, a vinyl chloride-vinyl acetate copolymer, a vinyl chloride-vinylidene chloride copolymer, a vinyl chloride-acrylonitrile copolymer, an acrylic ester-vinyl chloride-vinylidene chloride copolymer, and a methacrylic ester-vinyl chloride copolymer.

The urethane-based resin refers to a resin that includes a urethane bond in at least a part of a molecular chain constituting the resin, and may be a urethane resin or a copolymer including a urethane bond in at least a part of a molecular chain. For example, the urethane-based resin may be that obtained by causing polyisocyanate and polyol to react. Alternatively, for example, the urethane-based resin may be that obtained by causing polyester and polyol to react. In the present specification, the urethane-based resin also includes that obtained by a reaction with a curing agent.

Polyisocyanate includes, for example, at least one type selected from the group consisting of diphenylmethane diisocyanate (MDI), tolylene diisocyanate (TDI), xylylene diisocyanate (XDI), 1,5-pentamethylene diisocyanate (PDI), hexamethylene diisocyanate (HDI), isophorone diisocyanate (IPDI), and the like. In the present specification, polyisocyanate refers to a compound including two or more isocyanate groups in a molecule. Polyisocyanate may be polyisocyanate contained in a curing agent.

As polyol, any appropriate polyol may be adopted as long as it is polyol that includes two or more OH groups. Polyol includes, for example, at least one type selected from the group consisting of polyol including two OH groups (diol), polyol including three OH groups (triol), polyol including four OH groups (tetraol), polyol including five OH groups (pentaol), polyol including six OH groups (hexaol), and the like. Specifically, polyol includes, for example, at least one type selected from the group consisting of polyester-based polyol, polyether-based polyol, polycarbonate-based polyol, polyester amide-based polyol, acrylate-based polyol, and the like.

Polyester includes, for example, at least one type selected from the group consisting of phthalic acid-based polyester and aliphatic polyester.

The thermoplastic resin may further include a thermoplastic resin other than the vinyl chloride-based resin and the urethane-based resin. Such a thermoplastic resin includes, for example, at least one type selected from the group consisting of vinyl acetate, an acrylic ester-acrylonitrile copolymer, an acrylic ester-acrylonitrile copolymer, an acrylic ester-vinylidene chloride copolymer, a methacrylic ester-vinylidene chloride copolymer, a methacrylic ester-ethylene copolymer, polyvinyl fluoride, a vinylidene chloride-acrylonitrile copolymer, an acrylonitrile-butadiene copolymer, a polyamide resin, polyvinyl butyral, cellulose derivatives (cellulose acetate butyrate, cellulose diacetate, cellulose triacetate, cellulose propionate, nitrocellulose), a styrene butadiene copolymer, a polyester resin, an amino resin, synthetic rubber, and the like.

The thermoset resin includes, for example, at least one type selected from the group consisting of a phenol resin, an epoxy resin, a polyurethane curable resin, a urea resin, a melamine resin, an alkyd resin, a silicone resin, a polyamine resin, a urea formaldehyde resin, and the like.

For the purpose of improving dispersibility of the magnetic particles, polar functional groups including $-SO_3M$, $-OSO_3M$, $-COOM$, $P=O(OM)_2$ (provided that in the formulae, M represents a hydrogen atom or alkali metal such as lithium, potassium, and sodium), side chain type amine including terminal groups expressed by $-NR1R2$ and $-NR1R2R3^+X^-$, main chain type amine expressed by $>NR1R2^+X^-$ (provided that in the formulae, R1, R2, and R3 each represent a hydrogen atom or a hydrocarbon group, and $X^-$ represents a halogen element ion of fluorine, chlorine, bromine, iodine, and the like, an inorganic ion, or an organic ion), and further, $-OH$, $-SH$, $-CN$, an epoxy group, and the like may be introduced into all of the binding agents described above. An introduction amount of these polar functional groups into the binding agent is favorably $10^{-1}$ mol/g or more and $10^{-8}$ mol/g or less, more favorably $10^{-2}$ mol/g or more and $10^{-6}$ mol/g or less.

(Conductive Particles)

Some of the conductive particles contained in the magnetic layer 43 may protrude from the magnetic surface to form the plurality of protrusions 430. By the plurality of protrusions 430 being formed by the conductive particles, it is possible to reduce electrical resistance of the magnetic surface and suppress charging of the magnetic surface. In addition, kinematic friction between the head unit 56 and the magnetic surface can be reduced during running of the magnetic tape MT.

It is favorable for the conductive particles to be an antistatic agent and a solid lubricant. It is favorable for the conductive particle to be a particle containing carbon. As the particle containing carbon, for example, at least one type selected from the group consisting of a carbon particle and a hybrid particle can be used, and using the carbon particle is favorable. An average primary particle size of the conductive particles is favorably 100 nm or less. When the average primary particle size of the conductive particles is 100 nm or less, inclusion of excessively-large particles with respect to the thickness of the magnetic layer 43 is suppressed even when the conductive particles are particles having a large particle size distribution (for example, carbon black or the like).

As the carbon particles, for example, one or more types selected from the group consisting of carbon black, acetylene black, Ketjenblack, carbon nanotubes, and graphene can be used, and it is favorable to use carbon black even out of these carbon particles. As carbon black, for example, SEAST TA manufactured by Tokai Carbon Co., Ltd. or Asahi #15, #15HS, or the like manufactured by Asahi Carbon Co., Ltd. can be used.

The hybrid particle contains carbon and a material other than carbon. The material other than carbon is, for example, an organic material or an inorganic material. The hybrid particle may be a hybrid particle in which carbon has adhered onto an inorganic particle surface and may specifically be, for example, hybrid carbon in which carbon has adhered onto a silica particle surface.

(Abrasive Particles)

Some of the abrasive particles contained in the magnetic layer 43 may protrude from the magnetic surface to form the plurality of protrusions 430. The protrusions 430 formed by the abrasive particles can be brought into contact with the head unit 56 during sliding between the head unit 56 and the magnetic tape MT.

A lower limit value of a Mohs hardness of the abrasive particles is favorably 7.0 or more, more favorably 7.5 or more, further more favorably 8.0 or more, particularly favorably 8.5 or more from the viewpoint of suppressing deformation due to contact with the head unit 56. An upper limit value of the Mohs hardness of the abrasive particles is favorably 9.5 or less from the viewpoint of suppressing abrasion of the head unit 56.

It is favorable for the abrasive particles to be inorganic particles. Examples of the inorganic particles include α-alumina having an α conversion rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating and annealing raw materials of magnetic iron oxide, a resultant obtained by treating a surface of those with aluminum and/or silica as necessary, diamond powder, and the like. As the inorganic particles, it is favorable to use alumina particles of α-alumina, β-alumina, γ-alumina, and the like and/or silicon carbide. The abrasive particles may have any shape including an acicular shape, a spherical shape, a cubic shape, and the like, but a shape having a corner at one portion thereof is favorable for its high abrasivity.

(Lubricant)

The lubricant includes, for example, at least one type selected from fatty acid and fatty acid ester, or favorably both of fatty acid and fatty acid ester. The magnetic layer 43 containing the lubricant, in particular, the magnetic layer 43 containing both of fatty acid and fatty acid ester, contributes to an improvement of running stability of the magnetic tape MT. More particularly, by the magnetic layer 43 containing the lubricant and including pores, favorable running stability is achieved. The improvement of the running stability is considered to be because a kinetic friction coefficient of the surface of the magnetic tape MT on the magnetic layer 43 side is adjusted to a value suited for running of the magnetic tape MT by the lubricant.

Fatty acid may favorably be a compound indicated by the following general formula (1) or (2). For example, one of the compound indicated by the following general formula (1) or the compound indicated by the general formula (2), or both may be contained as fatty acid.

Further, fatty acid ester may favorably be a compound indicated by the following general formula (3), (4), or (5). For example, one type, two types, or three types out of the compound indicated by the following general formula (3), the compound indicated by the general formula (4), and the compound indicated by the general formula (5) may be contained as fatty acid ester.

By the lubricant containing one or both of the compound indicated by the general formula (1) and the compound indicated by the general formula (2) and one type, two types, or three types out of the compound indicated by the general formula (3), the compound indicated by the general formula (4), and the compound indicated by the general formula (5), an increase of the kinetic friction coefficient due to repetitive recording or reproduction of the magnetic tape MT can be suppressed.

$$CH_3 (CH_2)_k COOH \tag{1}$$

(provided that in the general formula (1), k is an integer selected from a range of 14 or more and 22 or less, more favorably a range of 14 or more and 18 or less.)

$$CH_3 (CH_2)_n CH = CH (CH_2)_m COOH \tag{2}$$

(provided that in the general formula (2), a sum of n and m is an integer selected from a range of 12 or more and 20 or less, more favorably a range of 14 or more and 18 or less.)

$$CH_3 (CH_2)_p COO (CH_2)_q CH_3 \tag{3}$$

(provided that in the general formula (3), p is an integer selected from a range of 14 or more and 22 or less, more favorably a range of 14 or more and 18 or less, and q is an integer selected from a range of 2 or more and 5 or less, more favorably a range of 2 or more and 4 or less.)

$$CH_3 (CH_2)_r COO - (CH_2)_s CH(CH_3)_2 \tag{4}$$

(provided that in the general formula (4), r is an integer selected from a range of 14 or more and 22 or less, and s is an integer selected from a range of 1 or more and 3 or less.)

$$CH_3(CH_2)_rCOO—(CH)(CH_3)CH_2(CH_3)_u \qquad (5)$$

(provided that in the general formula (5), t is an integer selected from a range of 14 or more and 22 or less, and u is an integer selected from a range of 1 or more and 3 or less.)

(Antistatic Agent)

The antistatic agent contains carbon particles. The antistatic agent may further include at least one type selected from the group consisting of a natural surfactant, a non-ionic surfactant, a cationic surfactant, and the like. The carbon particles include, for example, at least one type selected from the group consisting of carbon black, acetylene black, Ketjenblack, carbon nanotubes, and graphene.

(Curing Agent)

The curing agent contains, for example, polyisocyanate and/or the like. For example, polyisocyanate may contain, as an isocyanate source, diphenylmethane diisocyanate (MDI), tolylene diisocyanate (TDI), xylylene diisocyanate (XDI), 1,5-pentamethylene diisocyanate (PDI), hexamethylene diisocyanate (HDI), isophorone diisocyanate (IPDI), or the like. Polyisocyanate may have a TMP adduct structure, an isocyanurate structure, a biuret structure, an allophanate structure, or the like.

Specifically, for example, polyisocyanate includes aromatic polyisocyanates such as an adduct of tolylene diisocyanate (TDI) and an active hydrogen compound, aliphatic polyisocyanates such as an adduct of hexamethylene diisocyanate (HMDI) and an active hydrogen compound, and the like. A weight average molecular weight of these polyisocyanates is desirably within a range of 100 or more and 3000 or less.

(Rust Inhibitor)

Examples of the rust inhibitor include phenols, naphthols, quinones, a heterocyclic compound containing a nitrogen atom, a heterocyclic compound containing an oxygen atom, a heterocyclic compound containing a sulfur atom, and the like.

(Non-Magnetic Reinforcement Particles)

Examples of the non-magnetic reinforcement particles include aluminum oxide ($\alpha$, $\beta$ or $\gamma$ alumina), chromium oxide, silicon oxide, diamond, garnet, emery, boron nitride, titanium carbide, silicon carbide, titanium carbide, titanium oxide (rutile-type or anatase-type titanium oxide), and the like.

(Underlayer)

The underlayer 42 is formed for mitigating a concavo-convex shape of the surface of the base body 41 and adjusting a concavo-convex shape of the magnetic surface. The underlayer 42 is a non-magnetic layer containing non-magnetic particles, a binding agent, and a lubricant. The underlayer 42 supplies the lubricant to the magnetic surface. The underlayer 42 may further contain at least one type of additive selected from the group consisting of an antistatic agent, a curing agent, a rust inhibitor, and the like as necessary.

An average thickness $t_2$ of the underlayer 42 is favorably 0.30 μm or more and 1.20 μm or less, more favorably 0.30 μm or more and 0.90 μm or less, further more favorably 0.30 μm or more and 0.60 μm or less. It is noted that the average thickness $t_2$ of the underlayer 42 is obtained similarly to the average thickness $t_1$ of the magnetic layer 43. It is noted that a magnification of a TEM image is adjusted as appropriate according to the thickness of the underlayer 42. When the average thickness $t_2$ of the underlayer 42 is 1.20 μm or less, stretchability of the magnetic tape MT by an external force becomes higher, and thus an adjustment of the width of the magnetic tape MT by the tension adjustment becomes easier.

It is favorable for the underlayer 42 to include a plurality of hole portions. By accumulating the lubricant in these plurality of hole portions, it is possible to further suppress a decrease of a supplying amount of the lubricant between the magnetic surface and the head unit 56 even after repetitively performing recording or reproduction (that is, even after the head unit 56 repetitively travels while being in contact with the surface of the magnetic tape MT). Accordingly, an increase of the kinetic friction coefficient can be further suppressed. In other words, excellent running stability can be obtained.

(Non-Magnetic Particles)

The non-magnetic particles include, for example, at least one type of inorganic particles and organic particles. Further, the non-magnetic particles may be carbon particles such as carbon black. It is noted that one type of non-magnetic particles may be used alone, or two or more types of non-magnetic particles may be used in combination. The inorganic particles include, for example, metal, metal oxide, metal carbonate, metal sulfate, metal nitride, metal carbide, metal sulfide, and the like. Examples of the shape of the non-magnetic particles include various shapes such as an acicular shape, a spherical shape, a cubic shape, and a plate shape, but are not limited to these shapes.

(Binding Agent, Lubricant)

The binding agent and the lubricant are similar to those of the magnetic layer 43 described above.

(Additive)

The antistatic agent, the curing agent, and the rust inhibitor are similar to those of the magnetic layer 43 described above.

(Back Layer)

The back layer 44 contains a binding agent and non-magnetic particles. The back layer 44 may further contain at least one type of additive selected from the group consisting of a lubricant, a curing agent, an antistatic agent, and the like as necessary. The binding agent and the non-magnetic particles are similar to those of the underlayer 42 described above. The curing agent and the antistatic agent are similar to those of the magnetic layer 43 described above.

An average particle size of the non-magnetic particles is favorably 10 nm or more and 150 nm or less, more favorably 15 nm or more and 110 nm or less. The average particle size of the non-magnetic particles is obtained similarly to the average particle size of the magnetic particles described above. The non-magnetic particles may include non-magnetic particles having two or more particle size distributions.

An upper limit value of an average thickness of the back layer 44 is favorably 0.60 μm or less. When the upper limit value of the average thickness of the back layer 44 is 0.60 μm or less, the thicknesses of the underlayer 42 and the base body 41 can be maintained thick even when the average thickness of the magnetic tape MT is 5.30 μm or less, and thus the running stability of the magnetic tape MT in the recording/reproducing device can be maintained. A lower limit value of the average thickness of the back layer 44 is not limited in particular and is, for example, 0.20 μm or more.

The average thickness to of the back layer 44 is obtained as follows. First, an average thickness tr of the magnetic tape MT is measured. The measurement method for the average thickness tr is as described in the following "average thickness of magnetic tape". Subsequently, the magnetic tape MT accommodated in the cartridge 10 is unwound, and the magnetic tape MT is cut out at a length of 250 mm at a position that is 30 m to 40 m in the longitudinal direction from one end of the magnetic tape MT on the outer circumferential side, to thus produce a sample. Next, the back layer 44 of the sample is removed using a solvent such as MEK (methyl ethyl ketone) or dilute hydrochloric acid. Next, using the laser hologauge (LGH-110C) manufactured by Mitutoyo Corporation, the thickness of the sample is measured at five positions, and those measurement values are simply averaged (arithmetic average), to calculate an average value $t_B$ [μm]. After that, the average thickness $t_b$ [μm] of the back layer 44 is obtained by the following equation. It is noted that the five measurement positions are randomly selected from the sample such that the five measurement positions become different positions in the longitudinal direction of the magnetic tape MT.

$$t_b \text{ [μm]} = t_T \text{ [μm]} - t_B \text{ [μm]}$$

(Average Thickness of Magnetic Tape)

An upper limit value of the average thickness (average total thickness) $t_T$ of the magnetic tape MT is favorably 5.30 μm or less, more favorably 5.10 μm or less, further more favorably 4.90 μm or less, particularly favorably 4.70 μm or less. When the average thickness tr of the magnetic tape MT is 5.30 μm or less, a recording capacity that can be recorded in one data cartridge can be made larger than that of a general magnetic tape. A lower limit value of the average thickness tr of the magnetic tape MT is not limited in particular and is, for example, 3.50 μm or more.

The average thickness tr of the magnetic tape MT is obtained as follows. First, the magnetic tape MT accommodated in the cartridge 10 is unwound, and the magnetic tape MT is cut out at a length of 250 mm at a position that is 30 m to 40 m in the longitudinal direction from one end of the magnetic tape MT on the outer circumferential side, to thus produce a sample. Next, using the laser hologauge (LGH-110C) manufactured by Mitutoyo Corporation as the measurement device, the thickness of the sample is measured at five positions, and those measurement values are simply averaged (arithmetic average), to calculate the average thickness tr [μm]. It is noted that the five measurement positions are randomly selected from the sample such that the five measurement positions become different positions in the longitudinal direction of the magnetic tape MT.

(Coercive Force Hc2)

An upper limit value of a coercive force Hc2 of the magnetic layer 43 in the longitudinal direction of the magnetic tape MT is favorably 2000 Oe or less, more favorably 1900 Oe or less, further more favorably 1800 Oe or less. When the coercive force Hc2 of the magnetic layer 43 in the longitudinal direction of the magnetic tape MT is 2000 Oe or less, sufficient electromagnetic conversion characteristics can be obtained even with a high recording density.

A lower limit value of the coercive force Hc2 of the magnetic layer 43 in the longitudinal direction of the magnetic tape MT is favorably 1000 Oe or more. When the coercive force Hc2 of the magnetic layer 43 measured in the longitudinal direction of the magnetic tape MT is 1000 Oe or more, demagnetization due to leakage flux from the recording head can be suppressed.

The coercive force Hc2 described above is obtained as follows. First, the magnetic tape MT accommodated in the cartridge 10 is unwound, and the magnetic tape MT is cut out at a position that is 30 m to 40 m in the longitudinal direction from one end of the magnetic tape MT on the outer circumferential side. After three magnetic tapes MT are superimposed on one another using a double-sided tape such that orientations of the magnetic tapes MT in the longitudinal direction become the same, the magnetic tapes MT are punched with a punch having φ of 6.39 mm, to produce a measurement sample. At this time, marking is performed using arbitrary ink not having a magnetic property so that the longitudinal direction (running direction) of the magnetic tapes MT can be recognized. Then, using a vibrating sample magnetometer (Vibrating Sample Magnetometer: VSM), an M-H loop of the measurement sample (entire magnetic tape MT) corresponding to the longitudinal direction (running direction) of the magnetic tape MT is measured. Next, acetone, ethanol, or the like is used to remove the coated films (the underlayer 42, the magnetic layer 43, the back layer 44, and the like) of the cut-out magnetic tape MT so that only the base body 41 remains. Then, after the obtained three base bodies 41 are superimposed on one another using a double-sided tape, the base bodies 41 are punched with the punch having φ of 6.39 mm, to produce a background correction sample (hereinafter, will be simply referred to as "correction sample"). After that, an M-H loop of the correction sample (base body 41) corresponding to the longitudinal direction of the base body 41 (the longitudinal direction of the magnetic tape MT) is measured using the VSM.

In the measurements of the M-H loop of the measurement sample (entire magnetic tape MT) and the M-H loop of the correction sample (base body 41), a high-sensitivity vibrating sample magnetometer "VSM-P7-15" manufactured by Toei Industry Co., Ltd. is used. Measurement conditions are measurement mode: full loop, maximum magnetic field: 15 k Oe, magnetic field step: 40 bit, Time constant of Locking amp: 0.3 sec, Waiting time: 1 sec, MH average number: 20.

After the M-H loop of the measurement sample (entire magnetic tape MT) and the M-H loop of the correction sample (base body 41) are obtained, the M-H loop of the correction sample (base body 41) is subtracted from the M-H loop of the measurement sample (entire magnetic tape MT) so that background correction is performed and an M-H loop that has been subjected to the background correction is obtained. A measurement/analysis program accompanying "VSM-P7-15" is used in this calculation of the background correction. The coercive force Hc2 is obtained from the obtained M-H loop that has been subjected to the background correction. It is noted that the measurement/analysis program accompanying "VSM-P7-15" is used in this calculation. It is assumed that the measurements of the M-H loops are both performed at 25° C.±2° C. and 50% RH±5% RH. It is also assumed that "demagnetization field correction" when measuring the M-H loop in the longitudinal direction of the magnetic tape MT is not performed.

(Squareness Ratio)

A squareness ratio S1 of the magnetic layer 43 in the vertical direction of the magnetic tape MT is favorably 62% or more, more favorably 65% or more, further more favorably 68% or more, particularly favorably 72% or more, most favorably 75% or more. When the squareness ratio S1 is 62% or more, the vertical orientation of the magnetic particles becomes sufficiently high, and thus additionally excellent electromagnetic conversion characteristics can be obtained.

The squareness ratio S1 in the vertical direction of the magnetic tape MT is obtained as follows. First, the magnetic tape MT accommodated in the cartridge 10 is unwound, and the magnetic tape MT is cut out at a position that is 30 m to 40 m in the longitudinal direction from one end of the magnetic tape MT on the outer circumferential side. After three magnetic tapes MT are superimposed on one another using a double-sided tape such that orientations of the magnetic tapes MT in the longitudinal direction become the same, the magnetic tapes MT are punched with a punch having φ of 6.39 mm, to produce a measurement sample. At this time, marking is performed using arbitrary ink not having a magnetic property so that the longitudinal direction (running direction) of the magnetic tapes MT can be recognized. Then, using the vibrating sample magnetometer (Vibrating Sample Magnetometer: VSM), an M-H loop of the measurement sample (entire magnetic tape MT) corresponding to the vertical direction of the magnetic tape MT (the vertical direction of the magnetic tape MT) is measured. Next, acetone, ethanol, or the like is used to remove the coated films (the underlayer 42, the magnetic layer 43, the back layer 44, and the like) of the cut-out magnetic tape MT so that only the base body 41 remains. Then, after the obtained three base bodies 41 are superimposed on one another using a double-sided tape, the base bodies 41 are punched with the punch having q of 6.39 mm, to produce a background correction sample (hereinafter, will be simply referred to as "correction sample"). After that, an M-H loop of the correction sample (base body 41) corresponding to the vertical direction of the base body 41 (the vertical direction of the magnetic tape MT) is measured using the VSM.

In the measurements of the M-H loop of the measurement sample (entire magnetic tape MT) and the M-H loop of the correction sample (base body 41), the high-sensitivity vibrating sample magnetometer "VSM-P7-15" manufactured by Toei Industry Co., Ltd. is used. Measurement conditions are measurement mode: full loop, maximum magnetic field: 15 k Oe, magnetic field step: 40 bit, Time constant of Locking amp: 0.3 sec, Waiting time: 1 sec, MH average number: 20.

After the M-H loop of the measurement sample (entire magnetic tape MT) and the M-H loop of the correction sample (base body 41) are obtained, the M-H loop of the correction sample (base body 41) is subtracted from the M-H loop of the measurement sample (entire magnetic tape MT) so that background correction is performed and an M-H loop that has been subjected to the background correction is obtained. The measurement/analysis program accompanying "VSM-P7-15" is used in this calculation of the background correction.

A saturation magnetization Ms (emu) and remanent magnetization Mr (emu) of the obtained M-H loop that has been subjected to the background correction are substituted into the following equation, to thus calculate the squareness ratio S1 (%). It is assumed that the measurements of the M-H loops are both performed at 25° C.±2° C. and 50% RH±5% RH. It is also assumed that "demagnetization field correction" when measuring the M-H loop in the vertical direction of the magnetic tape MT is not performed. It is noted that the measurement/analysis program accompanying "VSM-P7-15" is used in this calculation.

$$\text{Squareness ratio } S1 \ (\%) = (Mr/Ms) \times 100$$

A squareness ratio S2 of the magnetic layer 43 in the longitudinal direction (running direction) of the magnetic tape MT is favorably 35% or less, more favorably 30% or less, further more favorably 25% or less more, particularly favorably 20% or less, most favorably 15% or less. When the squareness ratio S2 is 35% or less, the vertical orientation of the magnetic particles becomes sufficiently high, and thus additionally excellent electromagnetic conversion characteristics can be obtained. It is noted that one of the squareness ratio S1 of the magnetic layer 43 in the vertical direction of the magnetic tape MT or the squareness ratio S2 of the magnetic layer 43 in the longitudinal direction (running direction) of the magnetic tape MT may be within the favorable range described above, and the other one may be outside the favorable range described above. Alternatively, both of the squareness ratio S1 of the magnetic layer 43 in the vertical direction of the magnetic tape MT and the squareness ratio S2 of the magnetic layer 43 in the longitudinal direction (running direction) of the magnetic tape MT may be within the favorable ranges described above.

The squareness ratio S2 in the longitudinal direction of the magnetic tape MT is obtained similarly to the squareness ratio S1 except that the M-H loop is measured in the longitudinal direction (running direction) of the magnetic tape MT and the base body 41.

(Ratio Hc2/Hc1)

A ratio Hc2/Hc1 between the coercive force Hc1 of the magnetic layer 43 in the vertical direction of the magnetic tape MT and the coercive force Hc2 of the magnetic layer 43 in the longitudinal direction of the magnetic tape MT satisfies a relationship of favorably Hc2/Hc1≤0.8, more favorably Hc2/Hc1≤0.75, further more favorably Hc2/Hc1≤0.7, particularly favorably Hc2/Hc1≤0.65, most favorably Hc2/Hc1≤0.6. By the coercive forces Hc1 and Hc2 satisfying the relationship of Hc2/Hc1≤0.8, the vertical orientation of the magnetic particles can be enhanced. Accordingly, since a magnetization transition width can be reduced and signals of a high output can be obtained during signal reproduction, additionally excellent electromagnetic conversion characteristics can be obtained. It is noted that as described above, when Hc2 is small, magnetization reacts sensitively by the magnetic field from the recording head in the vertical direction, and thus favorable recording patterns can be formed.

When the ratio Hc2/Hc1 is Hc2/Hc1≤0.8, it is particularly effective for the average thickness $t_1$ of the magnetic layer 43 to be 90 nm or less. When the average thickness $t_1$ of the magnetic layer 43 exceeds 90 nm, there is a fear that, when a ring-type head is used as the recording head, a lower area (an area on the underlayer 42 side) of the magnetic layer 43 will be magnetized in the longitudinal direction of the magnetic tape MT and the magnetic layer 43 cannot be magnetized uniformly in the thickness direction. Accordingly, there is a fear that additionally excellent electromagnetic conversion characteristics will not be obtained even when the ratio Hc2/Hc1 is set to be Hc2/Hc1≤0.8 (that is, even when the vertical orientation of the magnetic particles is enhanced).

A lower limit value of Hc2/Hc1 is not limited in particular and is, for example, 0.5≤Hc2/Hc1. It is noted that Hc2/Hc1 represents the vertical orientation of the magnetic particles, and a vertical orientation degree of the magnetic particles increases as Hc2/Hc1 decreases.

The method of calculating the coercive force Hc2 of the magnetic layer 43 in the longitudinal direction of the magnetic tape MT is as described above. The coercive force Hc1 of the magnetic layer 43 in the vertical direction of the magnetic tape MT is obtained similarly to the coercive force Hc2 of the magnetic layer 43 in the longitudinal direction of the magnetic tape MT except that the M-H loop is measured in the vertical direction (thickness direction) of the magnetic tape MT and the base body 41.

(Activation Volume $V_{act}$)

An activation volume $V_{act}$ is favorably 8000 nm$^3$ or less, more favorably 6000 nm$^3$ or less, further more favorably 5000 nm$^3$ or less, particularly favorably 4000 nm$^3$ or less, most favorably 3000 nm$^3$ or less. When the activation volume $V_{act}$ is 8000 nm$^3$ or less, a dispersion state of the magnetic particles becomes favorable, and thus it is possible to make a bit inversion area steep and suppress deterioration of magnetization signals recorded in an adjacent track due to a leakage magnetic field from the recording head. Accordingly, there is a fear that additionally excellent electromagnetic conversion characteristics will not be obtained.

The activation volume $V_{act}$ described above is obtained by the following equation derived from Street&Woolley.

$$V_{act} \ (\mathrm{nm}^3) = k_B \times T \times X_{irr} / (\mu_0 \times Ms \times S)$$

(provided that kg: a Boltzmann constant ($1.38 \times 10^{-23}$ J/K), T: temperature (K), $X_{irr}$: irreversible magnetic susceptibility, $\mu_0$: vacuum magnetic permeability, S: magnetic viscosity coefficient, Ms: saturation magnetization (emu/cm$^3$))

The irreversible magnetic susceptibility $X_{irr}$, the saturation magnetization Ms, and the magnetic viscosity coefficient S substituted into the above equation are obtained as follows using the VSM. It is noted that a measurement direction of the VSM is the vertical direction (thickness direction) of the magnetic tape MT. Further, it is assumed that the measurement using the VSM is performed at 25° C.±2° C. and 50% RH±5% RH with respect to the measurement sample cut out from the elongated magnetic tape MT. It is also assumed that the "demagnetization field correction" when measuring the M-H loop in the vertical direction (thickness direction) of the magnetic tape MT is not performed.

(Irreversible Magnetic Susceptibility $X_{irr}$)

The irreversible magnetic susceptibility $X_{irr}$ is defined as a tilt in the vicinity of a remanent coercive force Hr in a tilt of a remanent magnetization curve (DCD curve). First, a magnetic field of −1193 kA/m (15 k Oe) is applied to the entire magnetic tape MT, and the magnetic field is set back to zero to be set to a remanent magnetization state. After that, a magnetic field of about 15.9 kA/m (200 Oe) is applied in an opposite direction so as to set the magnetic field back to zero again, and a remanent magnetization amount is measured. Similarly after that, a measurement in which a magnetic field that is additionally 15.9 kA/m larger than the previous application magnetic field is applied so as to set the magnetic field back to zero is performed repetitively, the remanent magnetization amount is plotted with respect to the application magnetic field, and the DCD curve is measured. From the obtained DCD curve, a point at which the magnetization amount becomes zero is set as the remanent coercive force Hr, and further, the DCD curve is differentiated to obtain a tilt of the DCD curve in each of the magnetic fields. In this tilt of the DCD curve, the tilt in the vicinity of the remanent coercive force Hr becomes $X_{irr}$.

(Saturation Magnetization Ms)

First, similar to the measurement method for the squareness ratio S1 described above, an M-H loop that has been subjected to the background correction is obtained. Next, Ms (emu/cm$^3$) is calculated from a value of the saturation magnetization Ms (emu) of the obtained M-H loop and the volume (cm$^3$) of the magnetic layer 43 in the measurement sample. It is noted that the volume of the magnetic layer 43 is obtained by multiplying an area of the measurement sample by the average thickness $t_1$ of the magnetic layer 43. The method of calculating the average thickness $t_1$ of the magnetic layer 43 requisite for calculating the volume of the magnetic layer 43 is as described above.

(Magnetic Viscosity Coefficient S)

First, a magnetic field of −1193 kA/m (15 k Oe) is applied to the entire magnetic tape MT (measurement sample), and the magnetic field is set back to zero to be set to the remanent magnetization state. After that, a magnetic field equivalent to the value of the remanent coercive force Hr obtained from the DCD curve is applied in the opposite direction. In the state where the magnetic field is applied, the magnetization amount is continuously measured at regular time intervals for 1000 seconds. A relationship between the time t and the magnetization amount M (t) obtained in this manner is compared with the following equation, to calculate the magnetic viscosity coefficient S.

$$M(t) = M0 + S \times In \ (t)$$

(provided that M(t): magnetization amount of time t, MO: initial magnetization amount, S: magnetic viscosity coefficient, In(t): natural logarithm of time)

(Surface Roughness $R_b$ of Back Surface)

A surface roughness $R_b$ of the back surface (the surface roughness of the back layer 44) is favorably $R_b \leq 6.0$ [nm]. When the surface roughness $R_b$ of the back surface is within the range described above, additionally excellent electromagnetic conversion characteristics can be obtained.

The surface roughness $R_b$ of the back surface is obtained as follows. First, the magnetic tape MT accommodated in the cartridge 10 is unwound, and the magnetic tape MT is cut out at a length of 100 mm at a position that is 30 m to 40 m in the longitudinal direction from one end of the magnetic tape MT on the outer circumferential side, to thus produce a sample. Next, the sample is placed on a slide glass such that a to-be-measured surface thereof (the surface on the magnetic layer 43 side) faces upward, and an end portion of the sample is fixed by a mending tape. The surface shape is measured using VertScan (objective lens magnification of 20 folds) as the measurement device, and the surface roughness $R_b$ of the back surface is obtained by the following equation based on a standard of ISO 25178.

The measurement conditions are as follows.

Device: non-contact roughness meter that uses optical interference (Non-contact surface/layer cross-sectional shape measurement system VertScan R5500GL-M100-AC manufactured by Alphatec Solutions Co., Ltd.)

Objective lens: 20 folds

Measurement area: 640×480 pixels (visual field: visual field of about 237 μm×178 μm)

Measurement mode: phase

Wavelength filter: 520 nm

CCD: ⅓ inch

Noise removal filter: smoothing 3×3

Surface correction: correction using quadratic polynomial approximation surface

Measurement software: VS-Measure Version 5.5.2

Analysis software: VS-viewer Version 5.5.5

$$S_a = \frac{1}{A} \int \int_A |Z(x, y)| \, dxdy \qquad \text{[Equation 2]}$$

After measuring the surface roughness at five positions in the longitudinal direction of the magnetic tape MT as described above, an average value of arithmetic average roughnesses $S_a$ (nm) automatically calculated from surface profiles obtained at the respective positions is set as the surface roughness $R_b$ (nm) of the back surface.

(Young's Modulus in Longitudinal Direction of Magnetic Tape)

An upper limit value of the Young's modulus in the longitudinal direction of the magnetic tape MT is favorably 9.0 GPa or less, more favorably 8.0 GPa or less, further more favorably 7.5 GPa or less, particularly favorably 7.1 GPa or less. When the Young's modulus in the longitudinal direction of the magnetic tape MT is 9.0 GPa or less, the stretchability of the magnetic tape MT by an external force becomes higher, and thus an adjustment of the width of the magnetic tape MT by the tension adjustment becomes easier. Accordingly, off-tracks can be suppressed more appropriately, and data recorded onto the magnetic tape MT can be reproduced more accurately. A lower limit value of the Young's modulus in the longitudinal direction of the magnetic tape MT is favorably 3.0 GPa or more, more favorably 4.0 GPa or more. When the lower limit value of the Young's modulus in the longitudinal direction of the magnetic tape MT is 3.0 GPa or more, lowering of the running stability can be suppressed.

The Young's modulus in the longitudinal direction of the magnetic tape MT is a value indicating difficulty of the magnetic tape MT to expand and contract in the longitudinal direction by an external force. The larger this value is, the harder it is for the magnetic tape MT to expand and contract in the longitudinal direction by the external force, and the smaller the value is, the easier it is for the magnetic tape MT to expand and contract in the longitudinal direction by the external force.

It is noted that while the Young's modulus in the longitudinal direction of the magnetic tape MT is a value related to the longitudinal direction of the magnetic tape MT, it also has a correlation with the difficulty of the magnetic tape MT to expand and contract in the width direction. In other words, the larger this value is, the harder it is for the magnetic tape MT to expand and contract in the width direction by the external force, and the smaller this value is, the easier it is for the magnetic tape MT to expand and contract in the width direction by the external force. Accordingly, from the viewpoint of the tension adjustment, it is advantageous for the Young's modulus in the longitudinal direction of the magnetic tape MT to be as small as 9.0 GPa or less as described above.

A tensile testing machine (AG-100D manufactured by Shimadzu Corporation) is used for the measurement of the Young's modulus. When wishing to measure the Young's modulus in the longitudinal direction of the tape, the magnetic tape MT accommodated in the cartridge 10 is unwound, and the magnetic tape MT is cut out at a length of 180 mm at a position that is 30 m to 40 m in the longitudinal direction from one end of the magnetic tape MT on the outer circumferential side, to thus prepare a measurement sample. A jig that can fix the tape width (½ inch) is attached to the tensile testing machine, and upper and lower sides of the tape width are fixed. The distance (the length of the tape between chucks) is set to 100 mm. After chucking the tape sample, a stress is gradually applied in a direction of pulling the sample. A tensile speed is set to 0.1 mm/min. From a change of the stress and an elongation amount at this time, the Young's modulus is calculated using the following equation.

$$E \, (\text{N/m}^2) = ((\Delta N / S) / (\Delta x / L)) \times 10^6$$

$\Delta N$: change in stress (N)
S: cross-sectional area (mm$^2$) of test piece
$\Delta x$: elongation amount (mm)
L: distance (mm) between gripping jigs The cross-sectional area S of the measurement sample 10S described above is a cross-sectional area obtained before the tensile operation and is obtained as a product of the width of the measurement sample 10S (½ inch) and the thickness of the measurement sample 10S. As a range of a tensile stress when performing the measurement, a range of a tensile stress of a linear area is set in accordance with the thickness of the magnetic tape MT and/or the like. Herein, the range of the stress is 0.2 N to 0.7 N, and the stress change ($\Delta N$) and the elongation amount ($\Delta x$) at this time are used in the calculation. It is noted that the measurement of the Young's modulus described above is assumed to be performed at 25° C.±2° C. and 50% RH±5% RH.

(Young's Modulus in Longitudinal Direction of Base Body)

The Young's modulus in the longitudinal direction of the base body 41 is favorably 7.8 GPa or less, more favorably 7.0 GPa or less, further more favorably 6.6 GPa or less, particularly favorably 6.4 GPa or less. When the Young's modulus in the longitudinal direction of the base body 41 is 7.8 GPa or less, the stretchability of the magnetic tape MT by the external force becomes higher, and thus the adjustment of the width of the magnetic tape MT by the tension adjustment becomes easier. Accordingly, off-tracks can be suppressed more appropriately, and data recorded onto the magnetic tape MT can be reproduced more accurately. A lower limit value of the Young's modulus in the longitudinal direction of the base body 41 is favorably 2.5 GPa or more, more favorably 3.0 GPa or more. When the lower limit value of the Young's modulus in the longitudinal direction of the base body 41 is 2.5 GPa or more, lowering of the running stability can be suppressed.

The Young's modulus in the longitudinal direction of the base body 41 described above is obtained as follows. First, the magnetic tape MT accommodated in the cartridge 10 is unwound, and the magnetic tape MT is cut out at a length of 180 mm at a position that is 30 m to 40 m in the longitudinal direction from one end of the magnetic tape MT on the outer circumferential side. Subsequently, the underlayer 42, the magnetic layer 43, and the back layer 44 are removed from the cut-out magnetic tape MT, to obtain the base body 41. Using this base body 41, the Young's modulus in the longitudinal direction of the base body 41 is obtained similarly to the Young's modulus in the longitudinal direction of the magnetic tape MT described above.

The thickness of the base body 41 occupies more than half of the entire thickness of the magnetic tape MT. Accordingly, the Young's modulus in the longitudinal direction of the base body 41 has a correlation with the difficulty of the magnetic tape MT to expand and contract by the external force. The larger this value is, the harder it is for the magnetic tape MT to expand and contract in the width direction by the external force, and the smaller this value is, the easier it is for the magnetic tape MT to expand and contract in the width direction by the external force.

It is noted that while the Young's modulus in the longitudinal direction of the base body 41 is a value related to the longitudinal direction of the magnetic tape MT, it also has a correlation with the difficulty of the magnetic tape MT to expand and contract in the width direction. In other words, the larger this value is, the harder it is for the magnetic tape MT to expand and contract in the width direction by the external force, and the smaller this value is, the easier it is for the magnetic tape MT to expand and contract in the width direction by the external force. Accordingly, from the viewpoint of the tension adjustment, it is advantageous for the Young's modulus in the longitudinal direction of the base body 41 to be as small as 7.8 GPa or less as described above.

(Ratio $I_{\lambda n \leq 5}/I_{10 \leq \lambda n \leq 20}$ of Integrated Values of Power Spectral Density)

When a power spectral density (Power Spectral Density: hereinafter, will be referred to as "PSD") at each position of spatial wavelength $\lambda_n = 100/n$ [μm] (provided that n is an integer of 1 or more and 255 or less) is obtained using a 2D surface profile image of a measurement range of 100 [μm]× 100 [μm], that has been acquired by measuring the surface on the magnetic layer 43 side by an atomic force microscope (Atomic Force Microscope: hereinafter, will be referred to as "AFM"), a ratio $I_{\lambda n \leq 5}/I_{10 \leq \lambda n \leq 20}$ between an average value $I_{\lambda n \leq 5}$ of integrated values of the PSD within a range of spatial wavelength $\lambda_n \leq 5$ μm and an average value $I_{10 \leq \lambda n \leq 20}$ of integrated values of the PSD within a range of 10 μm≤spatial wavelength $\lambda_n \leq 20$ μm is 3.00 or less, favorably 2.80 or less, more favorably 2.60 or less, 2.40 or less, 2.20 or less, 2.10 or less, or 2.01 or less. When the ratio $I_{\lambda n \leq 5}/I_{10 \leq \lambda n \leq 20}$ exceeds 3.00, components of the short wavelength A ($\lambda n \leq 5$ μm) become numerous with respect to components of the long wavelength $\lambda$ (0 μm≤$\lambda$≤20 μm) in the concavities and convexities on the surface on the magnetic layer 43 side, and a distance between the magnetic tape MT and the head unit 56 (hereinafter, will be referred to as "spacing") becomes large. Accordingly, the electromagnetic conversion characteristics deteriorate.

The ratio $I_{\lambda n \leq 5}/I_{10 \leq \lambda n \leq 20}$ is obtained as follows. First, the magnetic tape MT accommodated in the cartridge 10 is unwound, and the magnetic tape MT is cut out at a length of about 10 cm from a position about 20 m from one end of the magnetic tape MT on the outermost circumferential side, to thus obtain Sample 1. Further, the magnetic tape MT is also cut out at a length of about 10 cm from a position about 50 m from the other end of the magnetic tape MT on an innermost circumferential side, to obtain Sample 2. Next, Sample 1 is cut to a size that fits in a sample holder and attached to the sample holder, and then a magnetic surface of Sample 1 is observed with the AFM at three points randomly selected from Sample 1, to obtain three 2D surface profile images.

The AFM measurement conditions are as follows.
Measurement device: medium-sized probe microscope system AFM 5500M (manufactured by Hitachi High-Tech Corporation)
Measurement range: 100 μm×100 μm
Resolution: X direction 512×Y direction 512
Measurement mode: DFM (shape)
Cantilever: SI-DF40P2
Automatic tilt correction: 1st order
Automatic tilt correction: 3rd order
Settings for AFM flattening processing are as follows.
Calculation target: Off
Mask: Off Tilt correction: Off
Line arrangement: Off
Calculation direction: XY Next, three 2D surface profile images are obtained from Sample 2 by procedures similar to those when obtaining the three 2D surface profile images from Sample 1. Thus, a total of six 2D surface profile images are obtained.

Next, using image analysis software (SPIP®, version 6.7.3, manufactured by Image Metrology A/S), an average X-PSD profile of the 2D surface profile images is acquired as follows.

(1) Using the image analysis software, a 2D surface profile image to be an image analysis target is opened.

(2) A 2D FFT/PSD analysis is selected from an analysis tab of the image analysis software to display a 2D FFT/PSD analysis menu, an average X-PSD profile is selected from the displayed menu, and an average X-PSD analysis of the 2D surface profile image is executed. Thus, an average X-PSD value of the 2D surface profile image is acquired.

Next, the average X-PSD value is substituted into the following equation to calculate the PSD [nm²].

$$PSD\ [\text{nm}^2] = (\text{average } X\!-\!PSD \text{ value}) \times$$
$$2 \times \text{minumum value of wavenumber } (1.00 \times 10^{-5})$$

Figure 11:
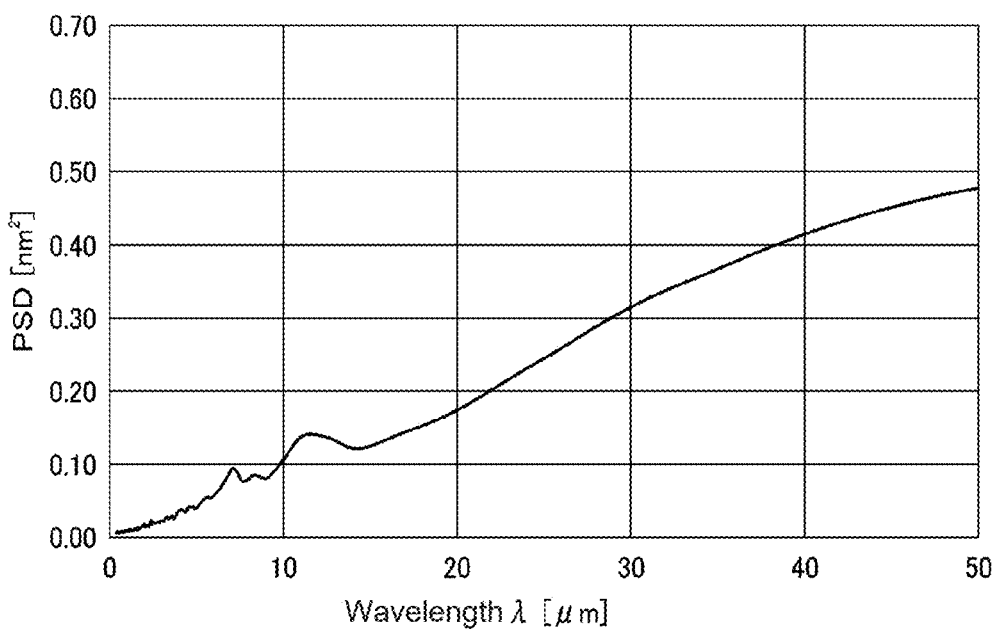
FIG. 11 is a graph showing an example of the power spectral density obtained by a 2D surface profile analysis.

In the above equation, the minimum value of the wavenumber $(1.00 \times 10^{-5})$ represents a minimum value of a wavenumber corresponding to the concavities and convexities on the surface on the magnetic layer 43 side. The minimum value of the wavenumber is determined from the measurement range of 100 μm×100 μm. That is, 1.00/100 μm=1.00/100000 nm=1.00×10⁻⁵ nm⁻¹ is established. FIG. 11 shows an example of the PSD calculated by the processes described above.

Next, for each of the six 2D surface profile images, an integrated value $I_1$ of the PSD [nm²] within the range of spatial wavelength $\lambda_n \leq 5$ μm, an integrated value $I_2$ of the PSD [nm²] within the range of spatial wavelength $\lambda_n \leq 10$ μm, and an integrated value $I_3$ of the PSD [nm²] within the range of spatial wavelength $\lambda_n \leq 20$ μm are calculated. The PSD at each position of the spatial wavelength $\lambda_n = 100/n$ [μm] (provided that n is an integer of 1 or more and 255 or less) is used to calculate the integrated value $I_1$, the integrated value $I_2$, and the integrated value $I_3$. Specifically, the integrated value $I_1$ of the PSD [nm²] within the range of spatial wavelength $\lambda_n \leq 5$ μm is acquired by integrating the PSDs at the respective positions of the spatial wavelength $\lambda_{n1} = 100/n_1$ [μm] (provided that mi is an integer of 20 or more and 255 or less). The integrated value $I_2$ within the range of spatial wavelength $\lambda_n \leq 10$ μm is acquired by integrating the PSDs at the respective positions of the spatial wavelength $\lambda_{n2} = 100/n_2$ [μm] (provided that $n_2$ is an integer of 10 or more and 255 or less). The integrated value $I_3$ within the range of spatial wavelength $\lambda_n \leq 20$ μm is acquired by integrating the PSDs at the respective positions of the spatial wavelength $\lambda_{n3} = 100/n_3$ [μm] (provided that $n_3$ is an integer of 5 or more and 255 or less).

Next, the six integrated values $I_1$ calculated from the six 2D surface profile images are simply averaged (arithmetic average) to calculate an average value $I_{\lambda n \leq 5}$ of the integrated values $I_1$. Next, the six integrated values $I_2$ calculated from the six 2D surface profile images are simply averaged (arithmetic average) to calculate an average value $I_{\lambda n \leq 10}$ of the integrated values $I_2$. Next, the six integrated values $I_3$ calculated from the six 2D surface profile images are simply averaged (arithmetic average) to calculate an average value $I_{\lambda_n \leq 20}$ of the integrated values $I_3$.

Next, the average value $I_{\lambda_n \leq 10}$ is subtracted from the average value $I_{\lambda_n \leq 20}$ to calculate an average value $I_{10 \leq \lambda_n \leq 20}$ ($I_{\lambda_n \leq 20} - I_{\lambda_n \leq 10}$). Next, a ratio ($I_{\lambda_n \leq 5}/I_{10 \leq \lambda_n \leq 20}$) between the average value $I_{\lambda_n \leq 5}$ and the average value $I_{10 \leq \lambda_n \leq 20}$ is calculated.

(Average Value $I_{\lambda_n \leq 5}$ of Integrated Values)

The average value $I_{\lambda_n \leq 5}$ of the integrated values of the PSD within the range of spatial wavelength $\lambda_n \leq 5$ µm obtained by measuring the surface on the magnetic layer 43 side with the AFM is favorably 2.20 nm$^2$ or less, more favorably 2.00 nm$^2$ or less, further more favorably 1.80 nm$^2$ or less, 1.60 nm$^2$ or less, or 1.40 nm$^2$ or less. When the average value $I_{\lambda_n \leq 5}$ of the integrated values is 2.20 nm$^2$ or less, an increase of the components of the short wavelength $\lambda$ ($\lambda \leq 5$ µm) in the concavities and convexities on the surface on the magnetic layer 43 side is suppressed, and the spacing becomes narrower. Accordingly, the electromagnetic conversion characteristics are improved.

(Average Value $I_{10 \leq \lambda_n \leq 20}$ of Integrated Values)

The average value $I_{10 \leq \lambda_n \leq 20}$ of the integrated values of the PSD within the range of 10 µm ≤ spatial wavelength $\lambda_n \leq 20$ µm obtained by measuring the surface on the magnetic layer 43 side with the AFM is favorably 0.65 nm$^2$ or more, more favorably 0.66 nm$^2$ or more, further more favorably 0.67 nm$^2$ or more. When the average value $I_{10 \leq \lambda_n \leq 20}$ of the integrated values is 0.65 nm$^2$ or more, a contact state between the magnetic tape MT and the head unit 56 is stabilized so that powder fall is reduced, and deterioration of running performance of the magnetic tape MT is suppressed.

The average value $I_{10 \leq \lambda_n \leq 20}$ of the integrated values of the PSD within the range of 10 µm ≤ spatial wavelength $\lambda_n \leq 20$ µm obtained by measuring the surface on the magnetic layer 43 side with the AFM is favorably 0.72 nm$^2$ or less, more favorably 0.71 nm$^2$ or less, further more favorably 0.70 nm$^2$ or less. When the average value $I_{10 \leq \lambda_n \leq 20}$ of the integrated values is 0.70 nm$^2$ or less, the spacing between the head unit 56 and the magnetic tape MT can be suppressed, and the electromagnetic conversion characteristics are stabilized.

(Kurtosis Sku, Root Mean Square Roughness Sq)

An average value of a kurtosis Sku on the surface on the magnetic layer 43 side is 5.50 or less, favorably 3.30 or more and 5.50 or less, more favorably 3.80 or more and 5.50 or less, further more favorably 3.80 or more and 4.80 or less. When the average value of the kurtosis Sku is 5.50 or less, a situation where the concavities and convexities on the surface on the magnetic layer 43 side become excessively sharp is suppressed, and the protrusions 430 on the surface on the magnetic layer 43 side are less likely to be scraped off during sliding between the head unit 56 and the magnetic tape MT. Accordingly, powder fall during recording or reproduction is suppressed. Meanwhile, when the average value of the kurtosis Sku is 3.30 or more, a contact area between the head unit 56 and the magnetic tape MT is reduced, and the kinetic friction coefficient during recording or reproduction is reduced.

From the viewpoint of improving the electromagnetic conversion characteristics, an average value of the root mean square roughness Sq on the surface on the magnetic layer 43 side is favorably 2.25 nm or less, more favorably 2.20 nm or less, further more favorably 2.15 nm or less, 2.10 nm or less, 2.05 nm or less, or 2.01 nm or less.

The average value of the kurtosis Sku and the average value of the root mean square roughness Sq on the surface on the magnetic layer 43 side are obtained as follows.

First, similar to the measurement method for the ratio $I_{\lambda_n \leq 5}/I_{10 \leq \lambda_n \leq 20}$ of the integrated values of the PSD, a total of six 2D surface profile images are obtained from the magnetic tape MT.

Next, using the image analysis software (SPIP®, version 6.7.3, manufactured by Image Metrology A/S), the kurtosis Sku and the root mean square roughness Sq of the 2D surface profile images are measured as follows.

(1) Using the image analysis software, the 2D surface profile image to be the image analysis target is opened.

(2) An Sa analysis is selected from the analysis tab, a Roughness & Texture Analysis window is opened, and Input Window and Parameters in the window are set as follows.

Plane Correction selection: Subtract Plane Parameters

SPIP Classic selected

Plug-in Parameters not selected (3) After setting the Roughness & Texture Analysis window as described above, a Calculate button in the window is pressed to execute an analysis of the kurtosis Sku and the root mean square roughness Sq. After the analysis is ended, analysis results are displayed.

Next, the six kurtosis Sku obtained from the six 2D surface profile images are simply averaged (arithmetic average) to calculate an average value of the kurtosis Sku. Further, the six root mean square roughness Sq obtained from the six 2D surface profile images are simply averaged (arithmetic average) to calculate an average value of the root mean square roughness Sq.

(Relationship Among Concavities and Convexities on Surface on Magnetic Layer 43 Side, Ratio $I_{\lambda_n \leq 5}/I_{10 \leq \lambda_n \leq 20v}$ of Integrated Values of PSD, and Kurtosis Sku)

Figure 10:
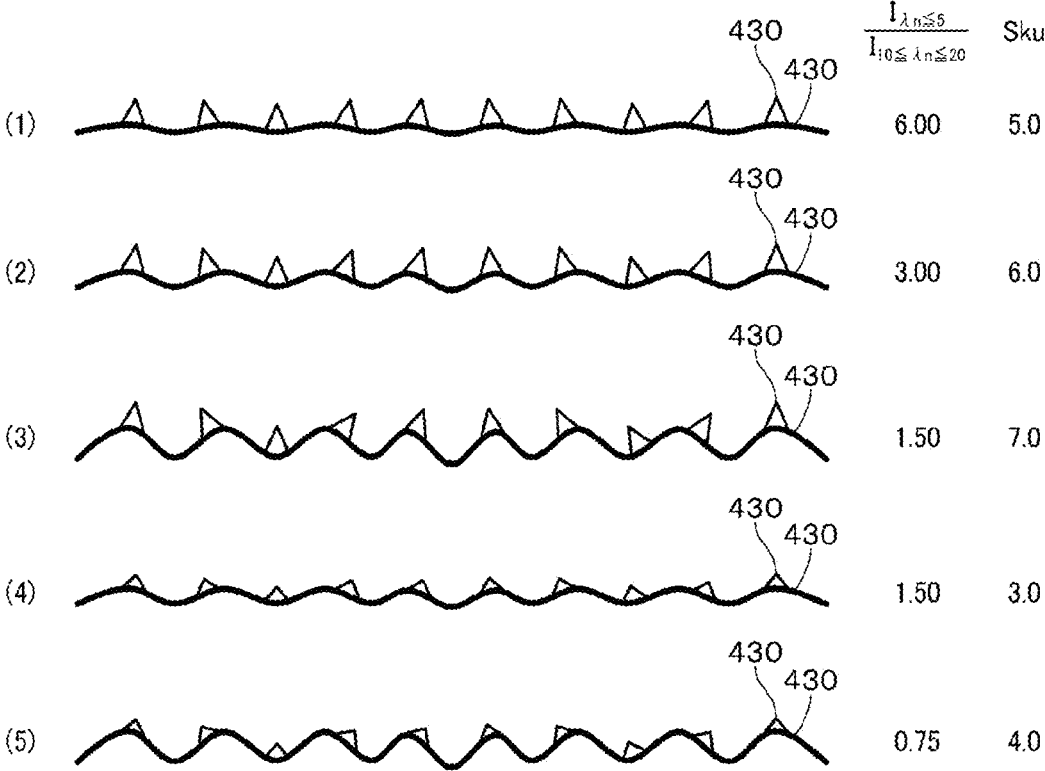
FIG. 10 is a diagram for explaining a relationship among concavities and convexities on a surface of the magnetic layer, a ratio $I_{\lambda_n \leq 5}/I_{10 \leq \lambda_n \leq 20}$, of integrated values of a power spectral density, and a kurtosis Sku.

FIG. 10 is a diagram for explaining a relationship among concavities and convexities on the surface on the magnetic layer 43 side, the ratio $I_{\lambda_n \leq 5}/I_{10 \leq \lambda_n \leq 20v}$ of the integrated values of the PSD, and the kurtosis Sku. The concavo-convex shapes (1) to (5) shown in FIG. 10 each express an image of the concavities and convexities on the surface on the magnetic layer 43 side. It is noted that FIG. 10 merely shows the image of the concavities and convexities and does not accurately express the actual concavities and convexities of the magnetic tape MT.

The ratio $I_{\lambda_n \leq 5}/I_{10 \leq \lambda_n \leq 20v}$ of the integrated values of the PSD decreases in the stated order of the concavo-convex shapes (1) to (5). Meanwhile, the kurtosis Sku does not decrease in the stated order of the concavo-convex shapes (1) to (5). Accordingly, there is no correlation between the ratio $I_{\lambda_n \leq 5}/I_{10 \leq \lambda_n \leq 20v}$ of the integrated values of the PSD and the kurtosis Sku.

For example, in the concavo-convex shape (1), the ratio $I_{\lambda_n \leq 5}/I_{10 \leq \lambda_n \leq 20v}$ of the integrated values of the PSD is of a large value, whereas the kurtosis Sku is of a small value. In this case, although it is possible to suppress occurrence of powder fall during recording or reproduction, there is a fear that excellent electromagnetic conversion characteristics cannot be obtained.

In the concavo-convex shape (3), the ratio $I_{\lambda_n \leq 5}/I_{10 \leq \lambda_n \leq 20v}$ of the integrated values of the PSD is of a small value, whereas the kurtosis Sku is of a large value. In this case, although excellent electromagnetic conversion characteristics can be obtained, there is a fear that powder fall will occur during recording or reproduction.

Accordingly, for obtaining excellent electromagnetic conversion characteristics and suppressing the occurrence of powder fall during recording or reproduction, it is favorable to set the numerical ranges for both of the ratio $I_{\lambda n \leq 5}/I_{10 \leq \lambda n \leq 20 v}$ of the integrated values of the PSD and the kurtosis Sku.

4 Manufacturing Method of Magnetic Tape

Next, an example of a manufacturing method of the magnetic tape MT having the configuration described above will be described.
(Coating Material Preparation Process)

First, a coating material for forming an underlayer is prepared by kneading and dispersing non-magnetic particles, a binding agent, and the like in a solvent. Next, a coating material for forming a magnetic layer is prepared by kneading and dispersing magnetic particles, a binding agent, and the like in a solvent. For preparing the coating material for forming a magnetic layer and the coating material for forming an underlayer, the following solvents, dispersion devices, and kneading devices can be used, for example.

Examples of the solvent used for the coating material preparation described above include: ketone-based solvents such as acetone, methyl ethyl ketone, methyl isobutyl ketone, and cyclohexanone; alcohol-based solvents such as methanol, ethanol, and propanol; ester-based solvents such as methyl acetate, ethyl acetate, butyl acetate, propyl acetate, ethyl lactate, and ethylene glycol acetate; ether-based solvents such as diethylene glycol dimethyl ether, 2-ethoxyethanol, tetrahydrofuran, and dioxane; aromatic hydrocarbon solvents such as benzene, toluene, and xylene; halogenated hydrocarbon solvents such as methylene chloride, ethylene chloride, carbon tetrachloride, chloroform, and chlorobenzene; and the like. These may be used alone or in a mixture as appropriate.

As the kneading device used for the coating material preparation described above, for example, kneading devices such as a continuous twin screw kneader, a continuous twin screw kneader capable of diluting in multiple stages, a kneader, a pressure kneader, and a roll kneader can be used, though not limited to these devices in particular. Further, as the dispersion device used for the coating material preparation described above, for example, dispersion devices such as a roll mill, a ball mill, a horizontal sand mill, a vertical sand mill, a spike mill, a pin mill, a tower mill, a pearl mill (for example, "DCP mill" manufactured by Nippon Eirich Co., Ltd., or the like), a homogenizer, and an ultrasonic disperser can be used, though not limited to these devices in particular.
(Application Process)

Next, the coating material for forming an underlayer is applied onto one of the main surfaces of the base body 41 and dried so as to form the underlayer 42. Subsequently, the coating material for forming a magnetic layer is applied onto this underlayer 42 and dried so that the magnetic layer 43 is formed on the underlayer 42. It is noted that when drying, the magnetic field of the magnetic particles is oriented in the thickness direction of the base body 41 by a solenoid coil, for example. Alternatively, when drying, the magnetic field of the magnetic particles may be oriented in the running direction (longitudinal direction) of the base body 41 by the solenoid coil, for example, and then oriented in the thickness direction of the base body 41. By performing the processing of orienting the magnetic particles once in the longitudinal direction in this manner, the vertical orientation degree (that is, the squareness ratio S1) of the magnetic particles can be additionally improved. After forming the magnetic layer 43, the back layer 44 is formed on the other one of the main surfaces of the base body 41. Thus, the magnetic tape MT is obtained.

For example, the squareness ratios S1 and S2 are set to desired values by adjusting an intensity of the magnetic field to be applied to the coated film of the coating material for forming a magnetic layer, a solid content concentration in the coating material for forming a magnetic layer, and drying conditions (drying temperature and drying time) of the coated film of the coating material for forming a magnetic layer. The intensity of the magnetic field to be applied to the coated film is favorably 2 times or more and 3 times or less of the coercive force of the magnetic particles. For further increasing the squareness ratio S1 (that is, for further reducing the squareness ratio S2), it is favorable to improve a dispersion state of the magnetic particles in the coating material for forming a magnetic layer. In addition, for further increasing the squareness ratio S1, it is also effective to magnetize the magnetic particles in advance at a stage before the coating material for forming a magnetic layer is put into an orientation device for orienting the magnetic field of the magnetic particles. It is noted that the adjustment methods for the squareness ratios S1 and S2 described above may each be used alone, or two or more may be used in combination.
(Curing Process)

Next, after the magnetic tape MT is wound in a roll, heating processing is performed on the magnetic tape MT in this state to thus cure the underlayer 42 and the magnetic layer 43.
(Calender Process)

Next, calender processing is performed on the obtained magnetic tape MT to thus smoothen the magnetic surface.
(Demagnetization Process and Servo Pattern Writing Process)

Next, after demagnetizing the magnetic tape MT, a servo pattern may be written on the magnetic tape MT as necessary.
(Cutting Process)

Next, the magnetic tape MT is cut into a predetermined width (for example, ½-inch width). Thus, the magnetic tape MT is obtained.
(Adjustment Method for Ratio $I_{\lambda n \leq 5}/I_{10 \leq \lambda n \leq 20 v}$ of Integrated Values of PSD, Kurtosis Sku, and Root Mean Square Roughness Sq)

The ratio $I_{\lambda n \leq 5}/I_{10 \leq \lambda n \leq 20 v}$ of the integrated values of the PSD, the kurtosis Sku, and the root mean square roughness Sq can be adjusted to desired values by, for example, adjusting a particle size and content of an inorganic additive to be added to the coating material for forming a magnetic layer, adjusting conditions of the calender processing, and adjusting the thicknesses of the underlayer 42 and the magnetic layer 43. Examples of the inorganic additive include inorganic particles such as carbon particles, abrasive particles such as alumina particles, and the like. Examples of the conditions of the calender processing include a temperature and pressure in the calender processing, and the like.

5 Operation and Effect

As described above, in the magnetic tape MT according to the embodiment, when the power spectral density at each position of spatial wavelength $\lambda_n = 100/n$ [μm] (provided that n is an integer of 1 or more and 255 or less) is obtained using a 2D surface profile image of a measurement range of 100 [μm]×100 [μm], that has been acquired by measuring the surface on the magnetic layer 43 side by the AFM, the ratio $I_{\lambda_{Tn}\leq5}/I_{10\leq\lambda_{Tn}\leq20}$ between the average value $I_{\lambda_{Tn}\leq5}$ of integrated values of the PSD within the range of spatial wavelength $\lambda_{Tn}\leq5$ μm and the average value $I_{10\leq\lambda_{Tn}\leq20}$ of integrated values of the PSD within the range of 10 μm≤spatial wavelength $\lambda_{Tn}\leq20$ μm is 3.00 or less. Thus, a spacing amount that affects the electromagnetic conversion characteristics can be set to a favorable amount. Accordingly, excellent electromagnetic conversion characteristics can be obtained.

In addition, the average value of the kurtosis Sku on the surface on the magnetic layer 43 side is 5.50 or less. Thus, it is possible to suppress scraping of the protrusions 430 on the surface on the magnetic layer 43 side during sliding between the head unit 56 and the magnetic tape MT. Accordingly, it is possible to suppress the occurrence of powder fall during recording or reproduction. Thus, it is possible to suppress deterioration of the running performance of the magnetic tape MT (for example, an increase in friction between the head unit 56 and the magnetic tape MT, and the like).

As shown in FIG. 6, when the servo stripes 113 of the A burst 111A and the B burst 111B are asymmetric and the servo stripes 113 of the C burst 112C and the D burst 112D are asymmetric, it is assumed that the head unit 56 will be maintained to be oblique with respect to the axis Ax parallel to the width direction of the magnetic tape MT during recording and reproduction of the magnetic tape MT.

Figure 12:
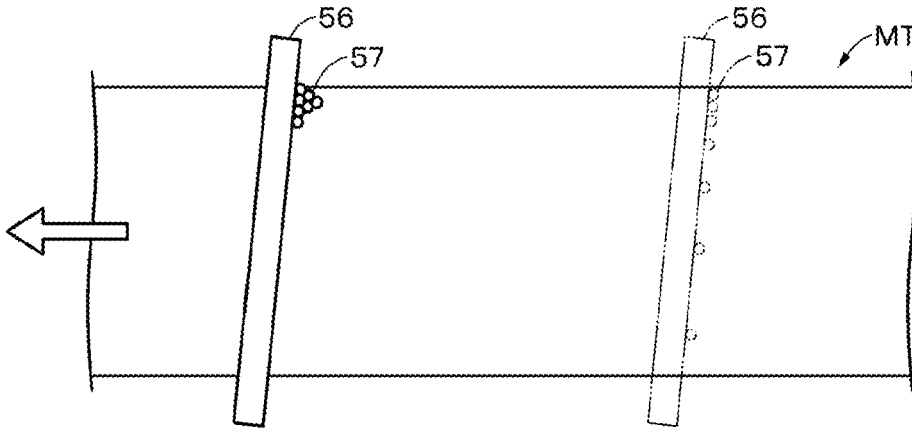
FIG. 12 is a diagram showing a state where powder generated by scraping of protrusions spreads.

As described above, in the magnetic tape MT in which the average value of the kurtosis Sku on the surface on the magnetic layer 43 side exceeds 5.50, the protrusions 430 on the surface on the magnetic layer 43 side are apt to be scraped off during recording or reproduction, and powder 57 is apt to fall off. When the head unit 56 is maintained to be oblique with respect to the axis Ax parallel to the width direction of the magnetic tape MT, the fallen powder 57 is apt to spread across the entire surface of the head unit 56 as the magnetic tape MT runs, as shown in FIG. 12. Therefore, there is a fear that the friction between the magnetic tape MT and the head unit 56 will increase during recording or reproduction, and the running stability will be lowered.

In contrast, in the magnetic tape MT according to the embodiment, since the average value of the kurtosis Sku on the surface on the magnetic layer 43 side is 5.50 or less as described above, scraping of the protrusions 430 on the surface on the magnetic layer 43 side during recording or reproduction is suppressed. Therefore, even when the head unit 56 is maintained obliquely during recording or reproduction, an increase of the friction between the magnetic tape MT and the head unit 56 can be suppressed, and lowering of the running stability can be suppressed.

6 Modified Example

Although the embodiment above has described the case where the magnetic tape cartridge is the single-reel-type cartridge 10, the magnetic tape cartridge may alternatively be a two-reel-type cartridge.

Figure 13:
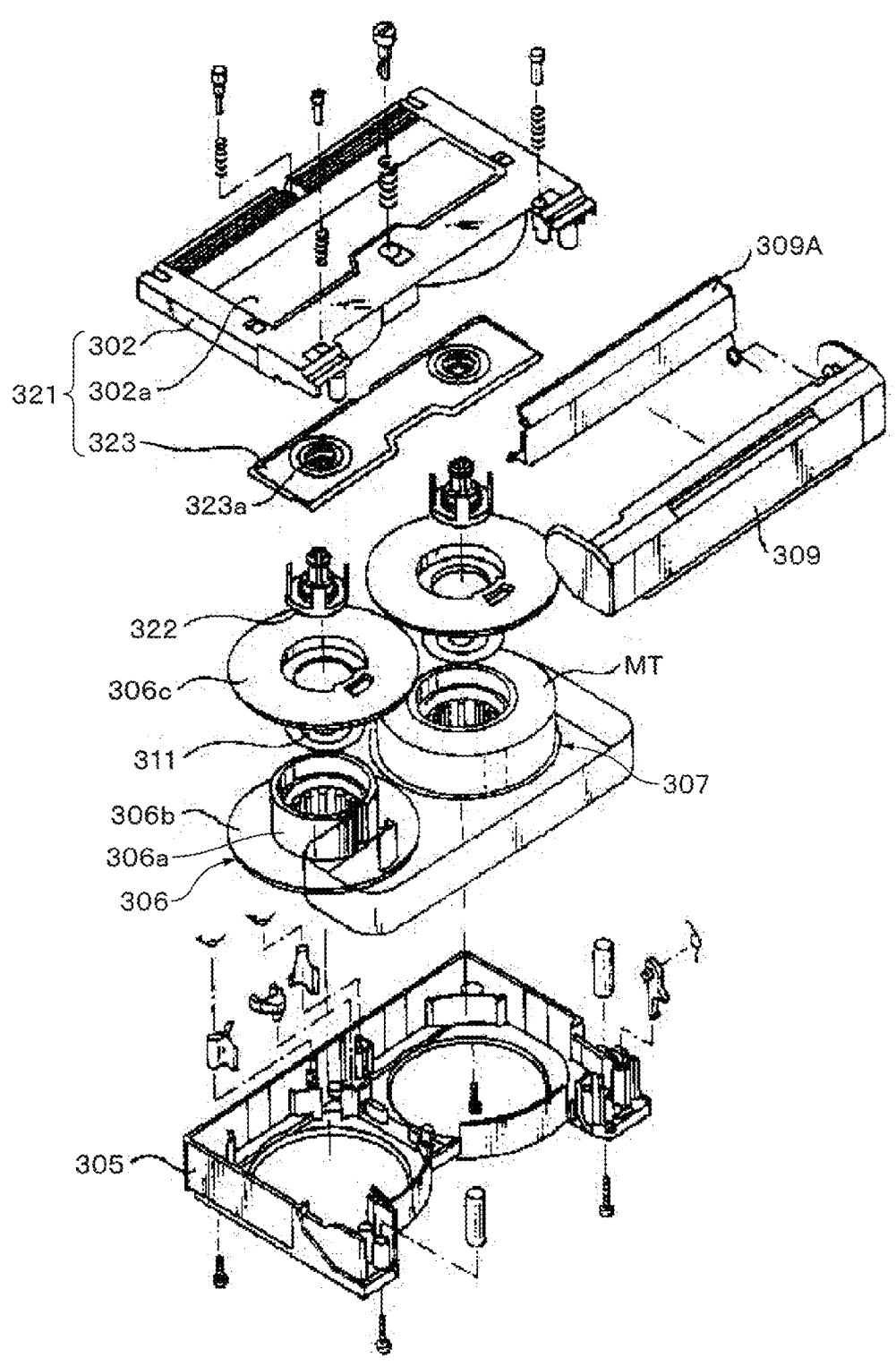
FIG. 13 is an exploded perspective view showing an exemplary configuration of a cartridge according to a modified example of the embodiment of the present disclosure.

FIG. 13 is an exploded perspective view showing an exemplary configuration of a two-reel-type cartridge 321. The cartridge 321 includes: an upper half 302 formed of a synthetic resin; a transparent window member 323 fit into and fixed to a window portion 302a opened on an upper surface of the upper half 302; reel holders 322 which are fixed on an inner side of the upper half 302 and prevent an uplift of reels 306 and 307; a lower half 305 corresponding to the upper half 302; the reels 306 and 307 accommodated in a space formed by combining the upper half 302 and the lower half 305; the magnetic tape MT wound around the reels 306 and 307; a front lid 309 that closes a front-side opening portion formed by combining the upper half 302 and the lower half 305; and a back lid 309A which protects the magnetic tape MT exposed from the front-side opening portion.

The reels 306 and 307 are for winding up the magnetic tape MT. The reel 306 includes a lower flange 306b including, at a center portion thereof, a cylindrical hub portion 306a around which the magnetic tape MT is wound, an upper flange 306c having substantially the same size as the lower flange 306b, and a reel plate 311 sandwiched between the hub portion 306a and the upper flange 306c. The reel 307 has a configuration similar to that of the reel 306.

In the window member 323, at positions respectively corresponding to the reels 306 and 307, attachment holes 323a for assembling the reel holders 322 as reel retention means for preventing an uplift of these reels are provided, respectively. The magnetic tape MT is similar to the magnetic tape MT in the first embodiment.

EXAMPLES

Hereinafter, the present disclosure will be specifically described by way of examples, but the present disclosure is not limited to these examples.

In the following examples and comparative examples, the average aspect ratio of the magnetic particles, the average particle volume of the magnetic particles, the average thickness of the magnetic tape, the average thickness of the magnetic layer, the average thickness of the underlayer, the average thickness of the back layer, the average value $I_{\lambda_{Tn}\leq5}$ of the integrated values of the PSD within the range of spatial wavelength $\lambda_{Tn}\leq5$ μm, the average value $I_{10\leq\lambda_{Tn}\leq20}$ of the integrated values of the PSD within the range of 10 μm≤spatial wavelength $\lambda_{Tn}\leq20$ μm, the ratio $I_{\lambda_{Tn}\leq5}/I_{10\leq\lambda_{Tn}\leq20}$ of the integrated values of the PSD, the kurtosis Sku, the root mean square roughness Sq, the squareness ratio S1 of the magnetic layer in the vertical direction of the magnetic tape, and the squareness ratio S2 of the magnetic layer in the longitudinal direction of the magnetic tape are values obtained by the measurement methods described in the embodiment described above.

Example 1

(Preparation Process of Coating Material for Forming Magnetic Layer)

The coating material for forming a magnetic layer was prepared as follows. First, a first composition of the following content was kneaded with an extruder. Next, the kneaded first composition and a second composition of the following content were added to a stirring tank equipped with a disperser and premixed. Then, dyno mill mixing was further performed and filter processing was performed, to prepare the coating material for forming a magnetic layer.

(First Composition)

Barium ferrite ($BaFe_{12}O_{19}$) magnetic powder (hexagonal plate shape, average aspect ratio 3.0, average particle volume 1200 $nm^3$): 100 parts by mass Vinyl chloride-based resin solution (resin solution content: vinyl chloride-based resin 30 mass %, cyclohexanone solution 70 mass %): 35 parts by mass (polymerization degree 300, Mn=10000, contains, as polar groups, $OSO_3K$=0.07 mmol/g, secondary OH=0.3 mmol/g)

Polyurethane resin solution (resin solution content: polyurethane resin content 30 mass %, cyclohexanone content 70 mass %): 30 parts by mass (polyurethane resin: number average molecular weight Mn=25000, glass transition temperature Tg=110° C.) Aluminum oxide powder: 3 parts by mass (α-Al$_2$O$_3$, average particle size 0.1 μm)

(Second Composition)

Carbon black: 1 part by mass (product name: SEAST S, manufactured by Tokai Carbon Co., Ltd., arithmetic average particle size 70 nm)

Polyurethane resin solution (resin solution content: poly-urethane resin 30 mass %, cyclohexanone 70 mass %): 5.56 parts by mass (Polyurethane resin: number average molecular weight Mn=25000, glass transition temperature Tg=110° C.)

n-butyl stearate: 2 parts by mass

Methyl ethyl ketone: 210 parts by mass

Toluene: 120 parts by mass

Cyclohexanone: 180 parts by mass

Finally, to the coating material for forming a magnetic layer that has been prepared as described above, polyiso-cyanate (product name: Coronate L, manufactured by Tosoh Corporation): 3.3 parts by mass and stearic acid: 2 parts by mass were added as a curing agent.

(Preparation Process of Coating Material for Forming Underlayer)

The coating material for forming an underlayer was prepared as follows. First, a third composition of the following content was kneaded with an extruder. Next, the kneaded third composition and a fourth composition of the following content were added to a stirring tank equipped with a disperser and premixed. Then, dyno mill mixing was further performed and filter processing was performed, to prepare the coating material for forming an underlayer.

(Third Composition)

Acicular iron oxide powder: 100 parts by mass (α-Fe$_2$O$_3$, average long axis length 0.11 μm) Vinyl chloride-based resin solution (resin solution content: vinyl chloride-based resin 30 mass %, cyclohexanone solution 70 mass %): 60 parts by mass (polymerization degree 300, Mn=10000, contains, as polar groups, OSO$_3$K=0.07 mmol/g, secondary OH=0.3 mmol/g)

Aluminum oxide powder: 4 parts by mass (α-Al$_2$O$_3$, average particle size 0.1 μm)

(Fourth Composition)

Carbon black: 25 parts by mass (product name: #80, manufactured by Asahi Carbon Co., Ltd.)

Polyurethane resin solution (resin solution content: poly-urethane resin content 30 mass %, cyclohexanone content 70 mass %): 40 parts by mass (Polyurethane resin: number average molecular weight Mn=25000, glass transition temperature Tg=70° C.)

n-butyl stearate: 2 parts by mass

Methyl ethyl ketone: 130 parts by mass

Toluene: 75 parts by mass

Cyclohexanone: 80 parts by mass

Finally, to the coating material for forming an underlayer that has been prepared as described above, polyisocyanate (product name: Coronate L, manufactured by Tosoh Corporation): 2.49 parts by mass and stearic acid: 2 parts by mass were added as a curing agent.

(Preparation Process of Coating Material for Forming Back Layer)

The coating material for forming a back layer was prepared as follows. The following raw materials were mixed in a stirring tank equipped with a disperser, and filter processing was performed, to prepare the coating material for forming a back layer.

Carbon black (product name: #80, manufactured by Asahi Carbon Co., Ltd.): 100 parts by mass Polyester polyurethane (product name: N-2304, manufactured by Nippon Polyurethane Industry Co., Ltd.): 100 parts by mass Methyl ethyl ketone: 500 parts by mass Toluene: 400 parts by mass Cyclohexanone: 100 parts by mass Polyisocyanate (product name: Coronate L, manufactured by Tosoh Corporation): 10 parts by mass (Application Process)

Using the coating material for forming a magnetic layer and the coating material for forming an underlayer that have been prepared as described above, an underlayer and a magnetic layer were formed as follows on one of main surfaces of an elongated polyethylene naphthalate film (hereinafter, will be referred to as "PEN film") which is a base film (non-magnetic supporting body) and has an average thickness of 4.00 μm. First, the coating material for forming an underlayer was applied onto one of the main surfaces of the PEN film and dried so that the underlayer is formed to have an average thickness after calender processing of 0.90 μm. Next, the coating material for forming a magnetic layer was applied onto the underlayer and dried so that the magnetic layer is formed to have an average thickness after the calender processing of 0.07 μm. When drying the coating material for forming a magnetic layer, the magnetic field of the magnetic particles was oriented in a thickness direction of the film by a solenoid coil. Thus, the squareness ratio S1 in the vertical direction (thickness direction) of the magnetic tape was set to 65%, and the squareness ratio S2 in the longitudinal direction of the magnetic tape was set to 38%.

After forming the underlayer and the magnetic layer, the coating material for forming a back layer was applied onto the other one of the main surfaces of the PEN film and dried so that a back layer is formed to have an average thickness after the calender processing of 0.30 μm. Thus, the magnetic tape was obtained.

(Curing Process)

After the magnetic tape is wound in a roll, heating processing was performed at 70° C. for 48 hours on the magnetic tape in this state, to thus cure the underlayer and the magnetic layer.

(Calender Process)

The calender processing was performed to smoothen a surface of the magnetic layer. At this time, the temperature of the calender processing was 100° C., and the pressure of the calender processing was 200 kg/cm.

(Cutting Process)

The magnetic tape obtained as described above was cut to a width of ½ inch (12.65 mm). Thus, a magnetic tape having an average thickness of 5.27 μm, in which the average value $I_{\lambda_n \leq 5}$ of the integrated values of the PSD within the range of spatial wavelength $\lambda_n \leq 5$ μm, the average value $I_{10 \leq \lambda_n \leq 20}$ of the integrated values of the PSD within the range of 10 μm≤spatial wavelength $\lambda_n \leq 20$ μm, the ratio $I_{\lambda_n \leq 5}/I_{10 \leq \lambda_n \leq 20}$ of the integrated values of the PSD, the kurtosis Sku, and the root mean square roughness Sq (hereinafter, will be referred to as "various surface parameters") are of values shown in Table 1, was obtained.

(Servo Pattern Writing Process)

After demagnetizing the cut magnetic tape, servo patterns were written on the magnetic tape using a servo writer, to form five servo bands. The servo patterns were made to conform to the LTO-8 standard. Thus, a desired magnetic tape was obtained.

Example 2

The magnetic tape in which the various surface parameters are of the values shown in Table 1 was obtained similarly to Example 1 except that the content of carbon black in the second composition was changed from 1 part by mass to 0.6 parts by mass in the preparation process of the coating material for forming a magnetic layer.

Example 3

The magnetic tape in which the various surface parameters are of the values shown in Table 1 was obtained similarly to Example 1 except that the content of aluminum oxide powder in the first composition was changed from 3 parts by mass to 5 parts by mass and the content of carbon black in the second composition was changed from 1 part by mass to 2 parts by mass in the preparation process of the coating material for forming a magnetic layer.

Comparative Example 1

The magnetic tape in which the various surface parameters are of the values shown in Table 1 was obtained similarly to Example 1 except that the content of aluminum oxide powder in the first composition was changed from 3 parts by mass to 7.5 parts by mass and the content of carbon black in the second composition was changed from 1 part by mass to 2.5 parts by mass in the preparation process of the coating material for forming a magnetic layer.

Comparative Example 2

The magnetic tape in which the various surface parameters are of the values shown in Table 1 was obtained similarly to Example 1 except that the arithmetic average particle size of carbon black in the second composition was changed from 70 nm to 50 nm and the content of carbon black in the second composition was changed from 1 part by mass to 1.5 parts by mass in the preparation process of the coating material for forming a magnetic layer.

Comparative Example 3

The magnetic tape in which the various surface parameters are of the values shown in Table 1 was obtained similarly to Example 1 except that the average particle size of aluminum oxide powder in the first composition was changed from 0.1 μm to 0.13 μm, the arithmetic average particle size of carbon black in the second composition was changed from 70 nm to 50 nm, and the content of carbon black in the second composition was changed from 1 part by mass to 2 parts by mass in the preparation process of the coating material for forming a magnetic layer.

Comparative Example 4

The magnetic tape in which the various surface parameters are of the values shown in Table 1 was obtained similarly to Example 1 except that the temperature of the calender processing was lowered by 10° C.
(Evaluation of Electromagnetic Conversion Characteristics)
First, reproduction signals of the magnetic tape were acquired using Loop Tester (manufactured by MicroPhysics, Inc.). Acquisition conditions of the reproduction signals are shown below.

head: GMR headspeed: 1.85 m/s signal: single recording frequency 10 MHz (as 2T half Nyquist frequency)

recording current: optimal recording current

Next, the reproduction signals were captured using a spectrum analyzer (spectrum analyzer) with a span (SPAN) of 0 to 20 MHz (resolution band width=100 kHz, VBW=30 kHz). Next, with a peak of the captured spectrum being the signal amount S and a floor noise excluding the peak being integrated from 3 MHz to 20 MHz to obtain the noise amount N, the ratio S/N between the signal amount S and the noise amount N was obtained as SNR (Signal-to-Noise Ratio). Then, the obtained SNR was converted into a relative value (dB) that uses, as a reference, the SNR of Comparative Example 4 as a reference medium. The results are shown in Table 1.
(Evaluation of Powder Fall)
First, the magnetic tape was incorporated into an LTO cartridge. Next, a drive of the LTO standard that is connected to a PC (Personal Computer) via an SCSI (Small Computer System Interface) was prepared, and the LTO cartridge was loaded into the drive. The generation of the drive of the LTO standard was matched with the generation of the LTO cartridge. Then, by operating the LTO drive with the PC, data was recorded onto the entire surface of the magnetic tape. Next, the recording head after the data recording was observed with an optical microscope to check an adhered substance on the recording head. Next, the checking results were evaluated based on the following criteria. The results are shown in Table 1.

Double circle: no adhered substance is observed o-mark: adhered substance is observed only at tape edge running portion 1x-mark: adhered substance is observed in tape running surface

TABLE 1

| | Average thickness of magnetic layer [μm] | Average thickness of underlayer [μm] | Average thickness of base film [μm] | Average thickness of back layer [μm] | Average thickness of magnetic tape [μm] | Root mean square roughness sq [nm] | Kurtosis sku | $I_{\lambda n \leq 5}$ [nm²] | $I_{10 \leq \lambda n \leq 20}$ [nm²] | $I_{\lambda n \leq 5}/I_{10 \leq \lambda n \leq 20}$ | SNR [dB] | Powder fall |
|---|---|---|---|---|---|---|---|---|---|---|---|---|
| Example 1 | 0.07 | 0.90 | 4.00 | 0.30 | 5.27 | 2.20 | 4.18 | 1.92 | 0.69 | 2.78 | 0.4 | ◎ |
| Example 2 | 0.07 | 0.90 | 4.00 | 0.30 | 5.27 | 2.01 | 3.85 | 1.35 | 0.67 | 2.01 | 0.8 | ◎ |
| Example 3 | 0.07 | 0.90 | 4.00 | 0.30 | 5.27 | 2.13 | 5.45 | 2.14 | 0.72 | 2.97 | 0.2 | ○ |
| Comparative Example 1 | 0.07 | 0.90 | 4.00 | 0.30 | 5.27 | 2.27 | 5.61 | 2.27 | 0.71 | 3.20 | −0.1 | X |

TABLE 1-continued

| | Average thickness of magnetic layer [μm] | Average thickness of underlayer [μm] | Average thickness of base film [μm] | Average thickness of back layer [μm] | Average thickness of magnetic tape [μm] | Root mean square roughness sq [nm] | Kurtosis sku | $I_{\lambda n \leq 5}$ [nm²] | $I_{10 \leq \lambda n \leq 20}$ [nm²] | $I_{\lambda n \leq 5}/I_{10 \leq \lambda n \leq 20}$ | SNR [dB] | Powder fall |
|---|---|---|---|---|---|---|---|---|---|---|---|---|
| Comparative Example 2 | 0.07 | 0.80 | 4.50 | 0.30 | 5.67 | 2.86 | 4.93 | 4.24 | 1.28 | 3.31 | −0.8 | ○ |
| Comparative Example 3 | 0.07 | 0.70 | 4.20 | 0.30 | 5.27 | 3.18 | 6.28 | 5.12 | 1.32 | 3.88 | −0.7 | X |
| Comparative Example 4 | 0.07 | 0.90 | 4.00 | 0.30 | 5.27 | 2.18 | 5.22 | 2.07 | 0.68 | 3.04 | 0 | ○ |

The following was found from the evaluation results shown in Table 1.

An excellent SNR can be obtained when the ratio $I_{\lambda n \leq 5}/I_{10 \leq \lambda n \leq 20}$ between the average value $I_{\lambda n \leq 5}$ of the integrated values of the PSD within the range of spatial wavelength $\lambda_n \leq 5$ μm that has been acquired by measuring the surface on the magnetic layer side by the AFM the average value $I_{10 \leq \lambda n \leq 20}$ of the integrated values of the PSD within the range of 10 μm≤spatial wavelength $\lambda_n \leq 20$ μm that has been acquired by measuring the surface on the magnetic layer side by the AFM is 3.00 or less.

When the average value of the kurtosis Sku on the surface on the magnetic layer side is 5.50 or less, powder fall during data recording and the like can be suppressed.

It can be seen from the evaluation results of Example 3 and Comparative Example 4 that an excellent SNR cannot be obtained only with small $I_{\lambda n \leq 5}$, and an excellent SNR can be obtained by setting the ratio $I_{\lambda n \leq 5}/I_{10 \leq \lambda n \leq 20}$ to 3.00 or less.

It can be seen from the evaluation results of Example 1 and Comparative Example 4 that an excellent SNR cannot be obtained only with small Ra, and an excellent SNR can be obtained by setting the ratio $I_{\lambda n \leq 5}/I_{10 \leq \lambda n \leq 20}$ to 3.00 or less.

Heretofore, the embodiments and modified examples of the present disclosure have been specifically described, but the present disclosure is not limited to the embodiments and modified examples above and can be variously modified based on the technical idea of the present disclosure. For example, the configurations, methods, processes, shapes, materials, numerical values, and the like described in the embodiments and modified examples above are mere examples, and configurations, methods, processes, shapes, materials, numerical values, and the like different from these may be used as necessary. The configurations, methods, processes, shapes, materials, numerical values, and the like of the embodiments and modified examples above can be mutually combined without departing from the gist of the present disclosure.

The chemical formulae of the compounds and the like exemplified in the embodiments and modified examples above are representative ones and are not limited to the described valences and the like as long as they correspond to general names of the same compounds. In the numerical ranges described stepwise in the embodiments and modified examples above, an upper limit value or lower limit value of a numerical range of a certain step may be replaced by an upper limit value or lower limit value of a numerical range of another step. Regarding the materials exemplified in the embodiments and modified examples above, one type can be used alone, or two or more types can be used in combination unless stated otherwise.

Further, the present disclosure can also adopt the following configurations.

(1)

A tape-type magnetic recording medium, including:

a base body; and a magnetic layer, in which an average thickness of the magnetic recording medium is 5.30 μm or less, when a power spectral density at each position of spatial wavelength $\lambda_n = 100/n$ [μm] (provided that n is an integer of 1 or more and 255 or less) is obtained using a 2D surface profile image of a measurement range of 100 [μm]×100 [μm], that has been acquired by measuring a surface on a side of the magnetic layer by an atomic force microscope, a ratio $I_{\lambda n \leq 5}/I_{10 \leq \lambda n \leq 20}$ between an average value $I_{\lambda n \leq 5}$ of integrated values of the power spectral density within a range of spatial wavelength $\Delta_n \leq 5$ μm and an average value $I_{10 \leq \lambda n \leq 20}$ of integrated values of the power spectral density within a range of 10 μm≤spatial wavelength $\Delta_n \leq 20$ μm is 3.00 or less, and an average value of a kurtosis on the surface on the side of the magnetic layer is 5.50 or less.

(2)

The magnetic recording medium according to (1), in which the ratio $I_{\lambda n \leq 5}/I_{10 \leq \lambda n \leq 20}$ is 2.80 or less.

(3)

The magnetic recording medium according to (1), in which the ratio $I_{\lambda n \leq 5}/I_{10 \leq \lambda n \leq 20}$ is 2.10 or less.

(4)

The magnetic recording medium according to any one of (1) to (3), in which the average value $I_{\lambda n \leq 5}$ of the integrated values is 2.20 nm² or less.

(5)

The magnetic recording medium according to any one of (1) to (4), in which the average value $I_{10 \leq \lambda n \leq 20}$ of the integrated values is 0.70 nm² or less.

(6)

The magnetic recording medium according to any one of (1) to (5), in which the average value $I_{10 \leq \lambda n \leq 20}$ of the integrated values is 0.65 nm² or more.

(7)

The magnetic recording medium according to any one of (1) to (6), in which the average value of the kurtosis on the surface on the side of the magnetic layer is 3.30 or more and 5.50 or less.

(8)

The magnetic recording medium according to any one of (1) to (6), in which the average value of the kurtosis on the surface on the side
of the magnetic layer is 3.80 or more and 5.50 or less.

(9)

The magnetic recording medium according to any one of
(1) to (6), in which
the average value of the kurtosis on the surface on the side
of the magnetic layer is 3.80 or more and 4.80 or less.

(10)

The magnetic recording medium according to any one of
(1) to (9), in which
an average value of a root mean square roughness on the
surface on the side of the magnetic layer is 2.25 nm or
less.

(11)

The magnetic recording medium according to any one of
(1) to (10), in which
the magnetic layer includes a servo pattern,
the servo pattern includes a plurality of first magnetization
areas and a plurality of second magnetization areas, and
the plurality of first magnetization areas and the plurality
of second magnetization areas are asymmetric with
respect to an axis parallel to a width direction of the
magnetic recording medium.

(12)

The magnetic recording medium according to (11), in
which
a tilt angle of the first magnetization areas with respect to
the axis and a tilt angle of the second magnetization
areas with respect to the axis differ, and
a larger one of the tilt angle of the first magnetization
areas or the tilt angle of the second magnetization areas
is 18° or more and 28° or less.

(13)

The magnetic recording medium according to any one of
(1) to (12), in which
the magnetic layer is configured to be capable of record-
ing signals at a data track width of 850 nm or less and
a bit length of 47 nm or less.

(14)

The magnetic recording medium according to any one of
(1) to (13), further including:
an underlayer, in which
an average thickness of the underlayer is 0.90 μm or less.

(15)

The magnetic recording medium according to any one of
(1) to (14), in which
an average thickness of the magnetic layer is 0.08 μm or
less.

(16)

The magnetic recording medium according to any one of
(1) to (15), in which
an average thickness of the base body is 4.40 μm or less.

(17)

The magnetic recording medium according to any one of
(1) to (16), in which
the magnetic layer contains magnetic particles, and
an average particle volume of the magnetic particles is
1500 $nm^3$ or less.

(18)

The magnetic recording medium according to any one of
(1) to (16), in which
the magnetic layer contains magnetic particles, and
the magnetic particles contain hexagonal ferrite, ε iron
oxide, or Co-containing spinel ferrite.

(19)

A tape-type magnetic recording medium, including:
a base body; and a magnetic layer, in which
an average thickness of the magnetic recording medium is
5.30 μm or less, and
when a power spectral density at each position of spatial
wavelength $\lambda_n=100/n$ [μm] (provided that n is an
integer of 1 or more and 255 or less) is obtained using
a 2D surface profile image of a measurement range of
100 [μm]×100 [μm], that has been acquired by mea-
suring a surface on a side of the magnetic layer by an
atomic force microscope, a ratio $I_{\lambda_n\leq5}/I_{10\leq\lambda_n\leq20}$
between an average value $I_{\lambda_n\leq5}$ of integrated values of
the power spectral density within a range of spatial
wavelength $\lambda_n\leq5$ μm and an average value $I_{10\leq\lambda_n\leq20}$ of
integrated values of the power spectral density within a
range of 10 μm≤spatial wavelength $\lambda_n\leq20$ μm is 3.00 or
less.

(20)

A cartridge, including:
the magnetic recording medium according to any one of
(1) to (19).

REFERENCE SIGNS LIST 10, 321 cartridge
10S sample
11 cartridge memory
31 antenna coil
32 rectification/power supply circuit
33 clock circuit
34 detection/modulation circuit
35 controller
36 memory
36A first storage area
36B second storage area
41 base body
42 underlayer
43 magnetic layer
44 back layer
56 head unit
56A, 56B servo read head
110 servo frame
111 servo sub-frame 1
112 servo sub-frame 2
113 servo stripe
111A A burst
111B B burst
112C C burst
112D D burst
210 measurement device
MT magnetic tape
SB servo band
DB data band
Tk data track

The invention claimed is:
1. A tape-type magnetic recording medium, comprising:
a base body; and
a magnetic layer, wherein
an average thickness of the magnetic recording medium is
5.30 μm or less,
when a power spectral density at each position of spatial
wavelength $\lambda_n=100/n$ [μm] (provided that n is an
integer of 1 or more and 255 or less) is obtained using
a 2D surface profile image of a measurement range of
100 [μm]×100 [μm], that has been acquired by mea-
suring a surface on a side of the magnetic layer by an
atomic force microscope, a ratio $I_{\lambda_n\leq5}/I_{10\leq\lambda_n\leq20}$
between an average value $I_{\lambda_n\leq5}$ of integrated values of the power spectral density within a range of spatial wavelength $\lambda_n{\le}5$ µm and an average value $I_{10{\le}\lambda n{\le}20}$ of integrated values of the power spectral density within a range of 10 µm≤spatial wavelength $\lambda_n{\le}20$ µm is 3.00 or less, and an average value of a kurtosis on the surface on the side of the magnetic layer is 5.50 or less.

2. The magnetic recording medium according to claim 1, wherein the ratio $I_{\lambda n{\le}5}/I_{10{\le}\lambda n{\le}20}$ is 2.80 or less.

3. The magnetic recording medium according to claim 1, wherein the ratio $I_{\lambda n{\le}5}/I_{10{\le}\lambda n{\le}20}$ is 2.10 or less.

4. The magnetic recording medium according to claim 1, wherein the average value $I_{\lambda n{\le}5}$ of the integrated values is 2.20 nm² or less.

5. The magnetic recording medium according to claim 1, wherein the average value $I_{10{\le}\lambda n{\le}20}$ of the integrated values is 0.70 nm² or less.

6. The magnetic recording medium according to claim 1, wherein the average value $I_{10{\le}\lambda n{\le}20}$ of the integrated values is 0.65 nm² or more.

7. The magnetic recording medium according to claim 1, wherein the average value of the kurtosis on the surface on the side of the magnetic layer is 3.30 or more and 5.50 or less.

8. The magnetic recording medium according to claim 1, wherein the average value of the kurtosis on the surface on the side of the magnetic layer is 3.80 or more and 5.50 or less.

9. The magnetic recording medium according to claim 1, wherein the average value of the kurtosis on the surface on the side of the magnetic layer is 3.80 or more and 4.80 or less.

10. The magnetic recording medium according to claim 1, wherein an average value of a root mean square roughness on the surface on the side of the magnetic layer is 2.25 nm or less.

11. The magnetic recording medium according to claim 1, wherein the magnetic layer includes a servo pattern, the servo pattern includes a plurality of first magnetization areas and a plurality of second magnetization areas, and the plurality of first magnetization areas and the plurality of second magnetization areas are asymmetric with respect to an axis parallel to a width direction of the magnetic recording medium.

12. The magnetic recording medium according to claim 11, wherein a tilt angle of the first magnetization areas with respect to the axis and a tilt angle of the second magnetization areas with respect to the axis differ, and a larger one of the tilt angle of the first magnetization areas or the tilt angle of the second magnetization areas is 18° or more and 28° or less.

13. The magnetic recording medium according to claim 1, wherein the magnetic layer is configured to be capable of recording signals at a data track width of 850 nm or less and a bit length of 47 nm or less.

14. The magnetic recording medium according to claim 1, further comprising:

an underlayer, wherein an average thickness of the underlayer is 0.90 µm or less.

15. The magnetic recording medium according to claim 1, wherein an average thickness of the magnetic layer is 0.08 µm or less.

16. The magnetic recording medium according to claim 1, wherein an average thickness of the base body is 4.40 µm or less.

17. The magnetic recording medium according to claim 1, wherein the magnetic layer contains magnetic particles, and an average particle volume of the magnetic particles is 1500 nm³ or less.

18. The magnetic recording medium according to claim 1, wherein the magnetic layer contains magnetic particles, and the magnetic particles contain hexagonal ferrite, ε iron oxide, or Co-containing spinel ferrite.

19. A cartridge, comprising:

the magnetic recording medium according to claim 1.

20. A tape-type magnetic recording medium, comprising:

a base body; and a magnetic layer, wherein an average thickness of the magnetic recording medium is 5.30 µm or less, and when a power spectral density at each position of spatial wavelength $\lambda_n{=}100/n$ [µm] (provided that n is an integer of 1 or more and 255 or less) is obtained using a 2D surface profile image of a measurement range of 100 [µm]×100 [µm], that has been acquired by measuring a surface on a side of the magnetic layer by an atomic force microscope, a ratio $I_{\lambda n{\le}5}/I_{10{\le}\lambda n{\le}20}$ between an average value $I_{\lambda n{\le}5}$ of integrated values of the power spectral density within a range of spatial wavelength $\lambda_n{\le}5$ µm and an average value $I_{10{\le}\lambda n{\le}20}$ of integrated values of the power spectral density within a range of 10 µm≤spatial wavelength $\lambda_n{\le}20$ µm is 3.00 or less.

\* \* \* \* \*